US010217304B2

(12) United States Patent
Chen

(10) Patent No.: US 10,217,304 B2
(45) Date of Patent: Feb. 26, 2019

(54) INTELLIGENT VEHICULAR ELECTRONIC KEY SYSTEM

(71) Applicant: IVTES LTD., New Taipei (TW)

(72) Inventor: Chi-Ting Chen, New Taipei (TW)

(73) Assignee: Ivtes Ltd., New Taipei (TW)

( * ) Notice: Subject to any disclaimer, the term of this patent is extended or adjusted under 35 U.S.C. 154(b) by 0 days.

(21) Appl. No.: 15/989,453

(22) Filed: May 25, 2018

(65) Prior Publication Data

US 2018/0357846 A1 Dec. 13, 2018

(30) Foreign Application Priority Data

Jun. 12, 2017 (TW) .............................. 106119423 A

(51) Int. Cl.
| | |
|---|---|
| *G07C 9/00* | (2006.01) |
| *H04W 4/44* | (2018.01) |
| *F02N 11/08* | (2006.01) |
| *B60R 25/24* | (2013.01) |
| *G07C 5/00* | (2006.01) |
| *G01S 5/00* | (2006.01) |

(52) U.S. Cl.
CPC ........ *G07C 9/00309* (2013.01); *B60R 25/241* (2013.01); *F02N 11/0807* (2013.01); *G01S 5/0018* (2013.01); *G07C 5/008* (2013.01); *G07C 9/00103* (2013.01); *G07C 9/00571* (2013.01); *H04W 4/44* (2018.02); *G07C 2009/00547* (2013.01)

(58) Field of Classification Search
CPC ................ G07C 9/00309; G07C 5/008; G07C 9/00103; G07C 9/00571; G07C 2009/00547; H04W 4/44; B60R 25/241; F02N 11/0807; G01S 5/0018
USPC ........................................................ 340/5.61
See application file for complete search history.

(56) References Cited

U.S. PATENT DOCUMENTS

| | | | | |
|---|---|---|---|---|
| 2009/0315765 | A1* | 12/2009 | Chen ....................... | H04W 4/02 342/357.25 |
| 2010/0231351 | A1 | 9/2010 | Lickfelt et al. | |
| 2011/0257817 | A1* | 10/2011 | Tieman ................... | B60R 25/24 701/2 |

(Continued)

FOREIGN PATENT DOCUMENTS

| | | |
|---|---|---|
| CN | 105083218 A | 11/2015 |
| CN | 105554105 A | 5/2016 |

*Primary Examiner* — Edwin C Holloway, III
(74) *Attorney, Agent, or Firm* — Rosenberg, Klein & Lee

(57) ABSTRACT

An intelligent vehicular electronic key system includes a cloud server, a first user device, a second user device and a vehicle control unit. The vehicle control unit is installed inside a vehicle and is connected to the cloud server through the Internet. When activating an electronic key sharing function, the first user transmits an electronic key information link to the second user device. After activating the electronic key information link, the second user device transmits a privilege authentication request and receives an access confirmation to and from the cloud server. The second user device further activates a vehicle control function and transmits a vehicle control signal to the vehicle control unit through the cloud server for the vehicle control unit to control operation of the vehicle. Accordingly, sharing access privilege of the electronic key enhances operation convenience of the vehicle.

18 Claims, 18 Drawing Sheets

(56) References Cited

U.S. PATENT DOCUMENTS

| | | | | |
|---|---|---|---|---|
| 2012/0280783 A1* | 11/2012 | Gerhardt | ............ | G07C 9/00309 |
| | | | | 340/5.6 |
| 2013/0179005 A1* | 7/2013 | Nishimoto | .......... | B60R 25/1001 |
| | | | | 701/2 |
| 2013/0259232 A1* | 10/2013 | Petel | ................... | H04L 63/0492 |
| | | | | 380/270 |
| 2014/0266573 A1* | 9/2014 | Sullivan | ............. | G07C 9/00571 |
| | | | | 340/4.32 |
| 2014/0365781 A1* | 12/2014 | Dmitrienko | ............. | G06F 21/34 |
| | | | | 713/185 |
| 2016/0055699 A1* | 2/2016 | Vincenti | ............ | G07C 9/00309 |
| | | | | 340/5.61 |

\* cited by examiner

INTELLIGENT VEHICULAR ELECTRONIC KEY SYSTEM

BACKGROUND OF THE INVENTION

1. Field of the Invention

The present invention relates to an electronic key system and, more particularly, to an intelligent vehicular electronic key system.

2. Description of the Related Art

Conventionally, to allow owners of vehicles at locations different from those of the owners to authorize the use of the vehicles to other persons, the owners can either leave vehicle keys with the authorized persons or go with them to the place where the vehicles are parked for vehicle access. Upon return of the vehicles, the vehicle keys must be returned to the owners as well. Therefore, the key handover process not only consumes time of owners and authorized persons but poses unexpected risk to key storage and operational security.

SUMMARY OF THE INVENTION

An objective of the present invention is to provide an intelligent vehicular electronic key system resolving issues of time consumed by the vehicle owner and the person authorized to use a physical vehicle key during the key handover process and unexpected risk arising from key storage and operational safety.

To achieve the foregoing objective, the intelligent vehicular electronic key system includes a cloud server, a first user device, a second user device and a vehicle control unit.

The first user device has a wireless network connection function and is connected to the cloud server through an Internet.

The second user device has a wireless network connection function and is connected to the cloud server through the Internet.

The vehicle control unit is installed inside a vehicle, has a wireless network connection function, and is connected to the cloud server through the Internet.

After activating an electronic key sharing function, the first user device transmits an electronic key information link to the second user device, after activating the electronic key information link, the second user device transmits an access privilege request to the cloud server, and after the cloud server replies an access confirmation to the second user device, the second user device activates a vehicle control function and transmits a vehicle control signal to the vehicle control unit through the cloud server for the vehicle control unit to control operation of the vehicle.

Given the foregoing intelligent vehicular electronic key system, the first user device, the second user device and the vehicle control unit are mutually connected through the cloud server and the Internet to achieve sharing of the access privilege of the electronic key in terms of control and operation of the vehicle and enhance convenience and security in sharing the access privilege.

To achieve the forgoing objective, the intelligent vehicular electronic key system includes a cloud server, a first user device, a second user device and a vehicle control unit.

The first user device has a wireless network connection function and is connected to the cloud server through an Internet.

The second user device has a wireless network connection function and a near-field connection function and is connected to the cloud server through the Internet.

The vehicle control unit is installed inside a vehicle, has a wireless network connection function and the near-field connection function, is connected to the cloud server through the Internet, and is built in with at least one set of first key information.

After activating an electronic key sharing function, the first user device transmits an electronic key information link to the second user device, after activating the electronic key information link, the second user device transmits an access privilege request to the cloud server, and after the cloud server replies an access confirmation and a second key information to the second user device, the second user device transmits a second key authentication request to the vehicle control unit, the vehicle control unit correctly authenticates the second key information with the at least one set of first key information and then replies the access confirmation to the second user device, and the second user device activates a vehicle control function and transmits a vehicle control signal to the vehicle control unit for the vehicle control unit to control operation of the vehicle.

Given the foregoing intelligent vehicular electronic key system, the second user device can be connected to the vehicle control unit through the near-field connection, and the second key information acquired from the cloud server is authenticated with the first key information in the vehicle control unit. After the second key information is correctly authenticated by the first key information, the second user device can then perform control over the vehicle, thereby achieving sharing of the access privilege of the electronic key in terms of control and operation of the vehicle and enhance convenience and security in sharing the access privilege. Additionally, when the vehicle control unit fails to be connected to the cloud server through the Internet, the second user device can be brought into play to control the vehicle.

Other objectives, advantages and novel features of the invention will become more apparent from the following detailed description when taken in conjunction with the accompanying drawings.

DETAILED DESCRIPTION OF THE INVENTION

Figure 1:
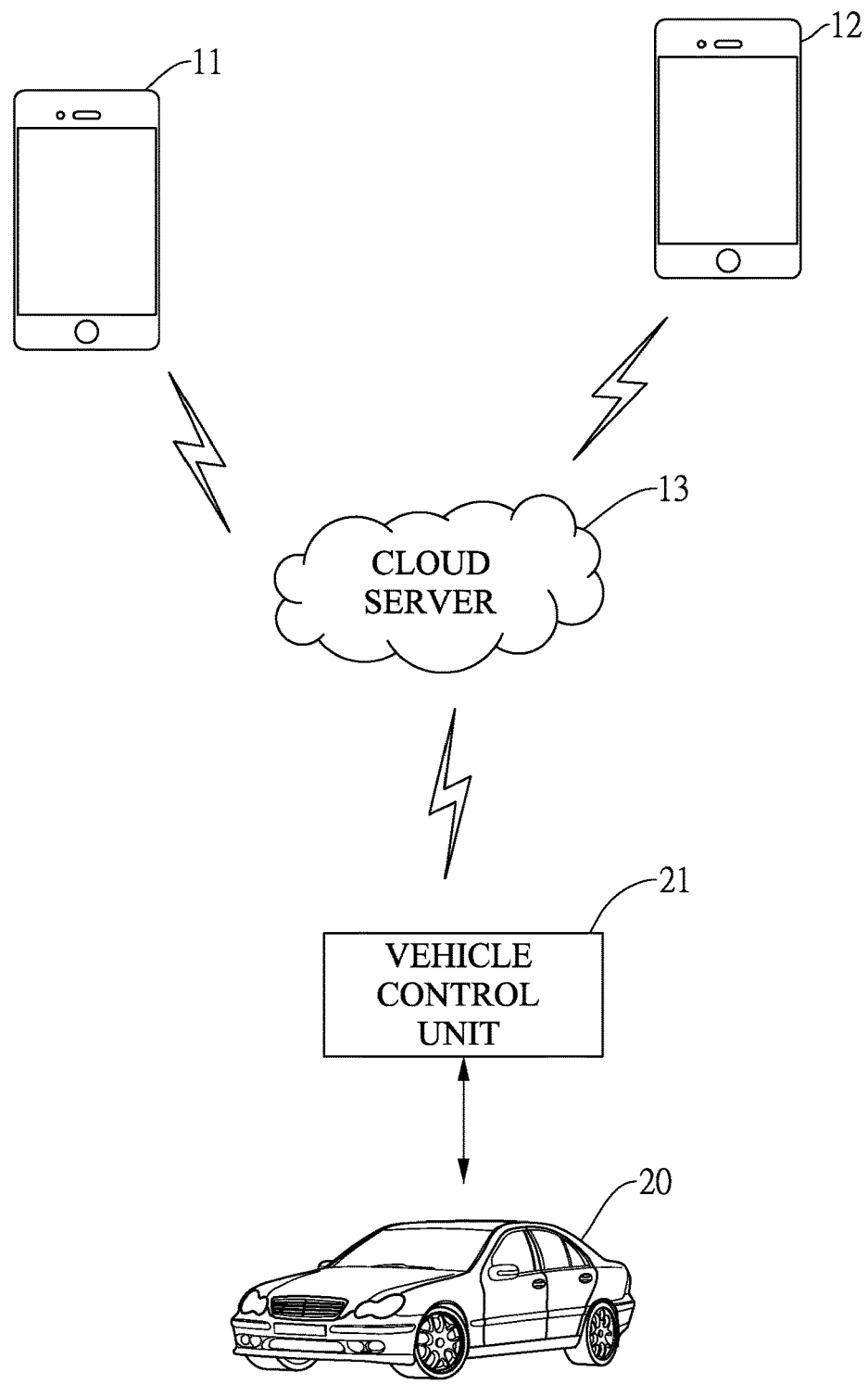
FIG. 1 is a schematic view showing a system architecture of an intelligent vehicular electronic key system in accordance with the present invention.

With reference to FIG. 1, an intelligent vehicular electronic key system in accordance with the present invention includes a first user device 11, a second user device 12, a cloud server 13 and a vehicle control unit 21. The cloud server 13 may be a cloud-based server host. The vehicle control unit 21 is installed inside a vehicle 20. In consideration of clearly showing the connectivity between the vehicle control unit 21 and the cloud server 13, the vehicle control unit 21 located outside the vehicle 20 in FIG. 1 is intended for that concern instead of a necessity.

The first user device 11 and the second user device 12 may be portable electronic devices or wearable electronic devices, such as smart phones, tablet personal computers (PC), laptop computers, personal digital assistants (PDA), smart watches or smart glasses, but are not limited thereto. Any mobile electronic device with wireless network connection capability, portability or wearability can be taken as the first user device 11 or the second user device 12. The wireless network connection capability can be implemented by wireless network modules complying with Wi-Fi, ZigBee, 3G, 3.5G, 4G or higher mobile standards and embedded in the first user device 11 or the second user device 12.

The first user device 11, the second user device 12, and the vehicle control unit 21 are wirelessly connected to the cloud server 13 through the Internet or other network for them to mutually and wirelessly communicate with one another, and communication among them are elaborated in conjunction with FIGS. 2 and 3 later.

Given a practical example for depicting the technical solution of the present invention, an owner of the vehicle 20 asks his/her friend or family to move the vehicle 20 to a designated location from elsewhere. The owner is a first user in possession of the first user device 11. The friend or the family is a second user in possession of the second user device 12.

When the first user (i.e. the owner) activates an electronic key sharing function through the first user device 11, the first user device 11 transmits an electronic key information link to the second user device 12 owned by the second user. After operating the second user device 12 to open the electronic key information link, the second user further operates the second user device 12 to activate a vehicle control function and transmit a vehicle control signal to the cloud server 13. The cloud server 13 then sends the vehicle control signal to the vehicle control unit 21 for the vehicle control unit 21 to control operation of the vehicle 20.

Figure 4A:
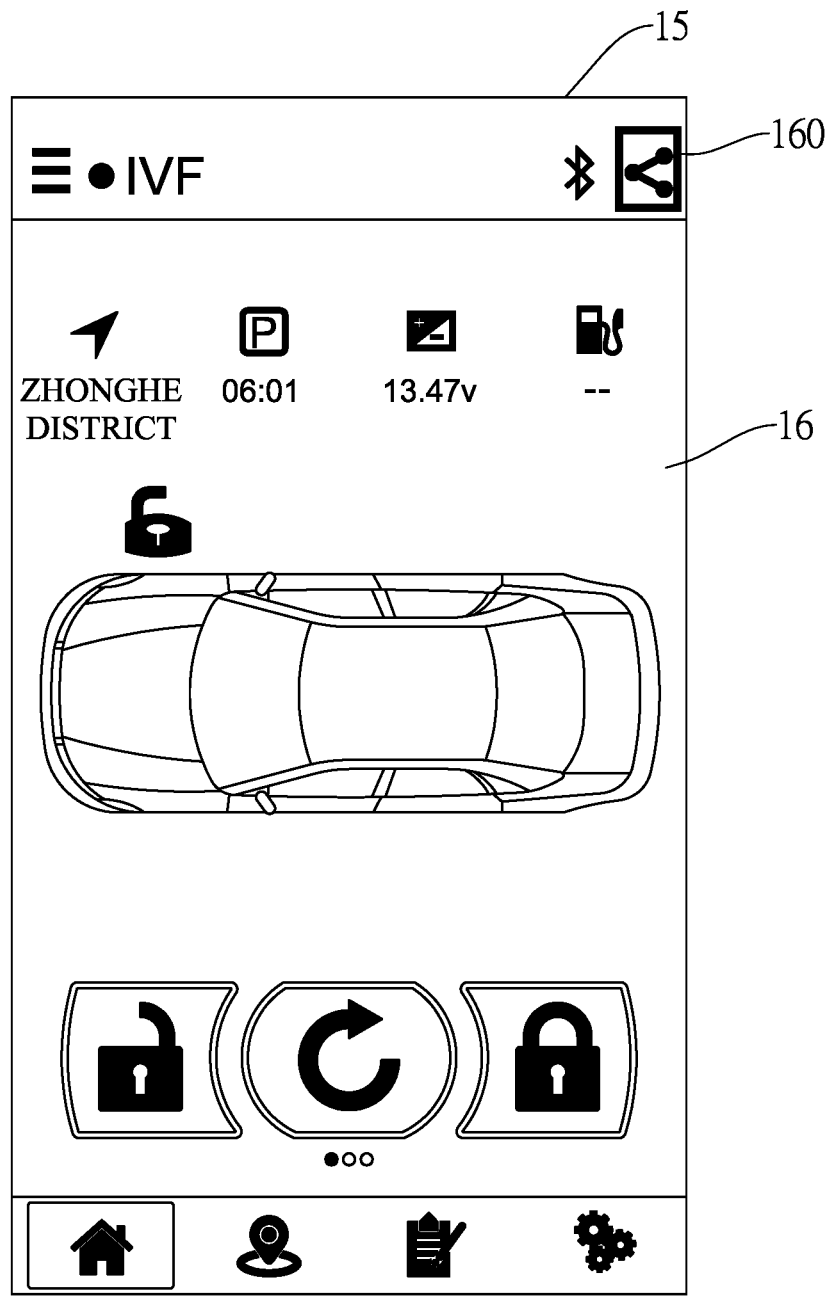
FIG. 4A is a schematic view of a first user interface showing a first owner operation in accordance with the present invention.

With reference to FIGS. 2A and 4A to 4D, the first user performs an electronic key application through the first user device 11. As shown in FIG. 4A, the first user device 11 has a first display screen 15. When the first user executes the electronic key application, a first user interface 16 is shown on the first display screen 15 of the first user device 11 to serve as the user interface upon operation of the electronic key application. When intending to share access privilege to the electronic key with the second user, the first user performs an electronic key sharing function (S11) shown on the first user interface 16. In the present embodiment, the electronic key sharing function marked by 160 is displayed at a top right corner of the first user interface 16. In the present invention the functions performed on the user interfaces are implemented by "press key", "button", "scrollbar control", "textbox", and the like and are selectively presented according to operational functions. For example, if intending to enable or disable the electronic key sharing function, the first user can operate elements on the first user interface 16 in association with the "scrollbar control", if intending to change the default name of the electronic key, the first user can operate elements on the first user interface 16 in association with the "textbox", and so on. Operations associated with the electronic key may be hereinafter expressed by "function" literally or corresponding practical operation of "press key", "button", scrollbar control", "textbox", and the like on the first user interface 16 but are not limited thereto.

Figure 4B:
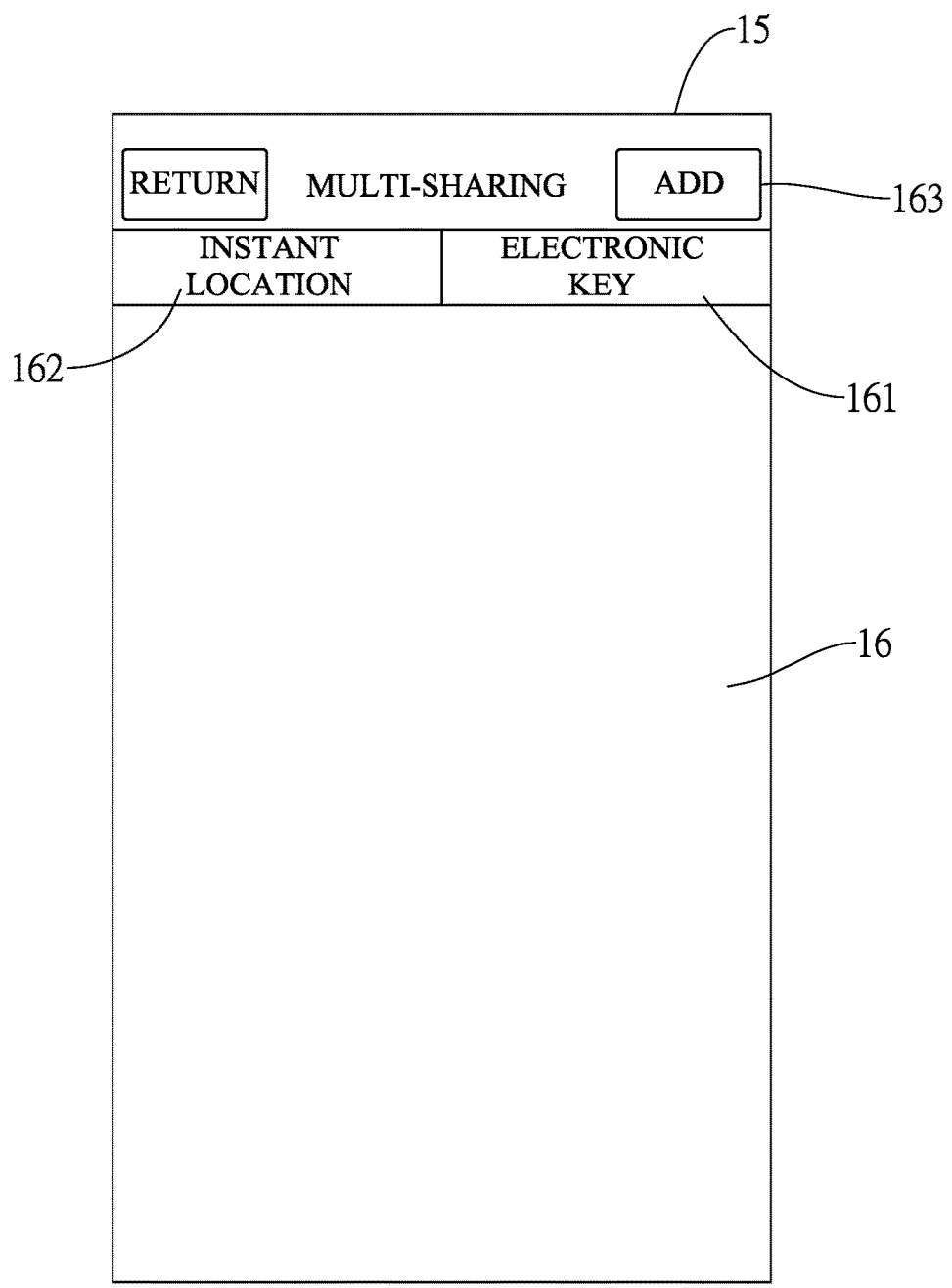
FIG. 4B is a schematic view of the first user interface in FIG. 4A showing a second owner operation.

When the first user selects to perform the electronic key sharing function 160, the picture on the first user interface 16 corresponding to the electronic key application is illustrated by FIG. 4B. As shown in FIG. 4B, the electronic key application includes an electronic key function 161 and an instant location function 162. When the first user selects the instant location function 162, the first user interface 16 displays coordinate and location information of the parking location of the vehicle 20. For example, on the first user interface 16 or another user interface additionally activated on the first display screen 15, such as web-based interface, the information of instant parking location of the vehicle 20 may be demonstrated by way of digital map, street view information, satellite image or texts but not limited thereto. In other words, when the first user selects the instant location function 162, a vehicle searching function is performed for the first user. The coordinate information of the instant parking location of the vehicle corresponds to the coordinate information of the vehicle control unit 21 inside the vehicle 20. One feasible solution including but not limited to the implementation of the instant location function 162 is proposed as follows. The vehicle control unit 21 maintains its connectivity with the cloud server 13 through the Internet, and the vehicle control unit 21 can continuously transmit the coordinate information thereof to the cloud server 13. As such, when the first user device 11 requests for coordinate information of the vehicle 20 through the cloud server 13, the cloud server 13 can transmit the coordinate information of the vehicle control unit 21 to the first user device 11 for the first user to be aware of the coordinate information of the instant parking location of the vehicle 20.

Figure 4C:
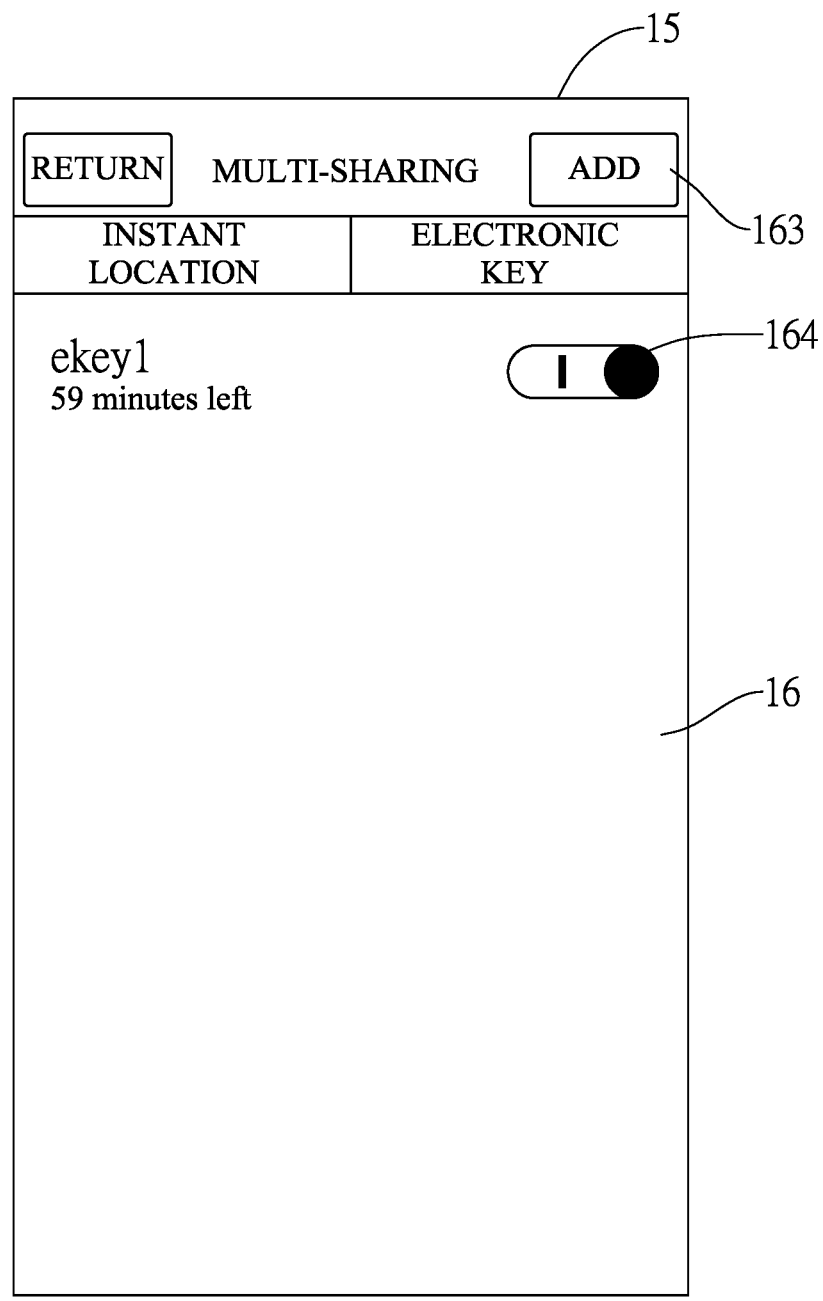
FIG. 4C is a schematic view of the first user interface in FIG. 4A showing a third owner operation.

After selecting the electronic key function 161, the first user can select a key-sharing function 163 to share the access privilege of an electronic key with a friend by creating an electronic key (eKey). After the first user selects the key-sharing function 163, the picture on the first user interface 16 corresponding to the electronic key application is illustrated by FIG. 4C. As shown in FIG. 4C, the electronic key application further includes a privilege-sharing function 164. After the first user selects the key-sharing function 163, a default state of the privilege-sharing function is enabled, and the first user interface 16 also displays name, privilege and remaining time for sharing of the electronic key sharable with the friend. For example, as shown in FIG. 4C, when the electronic key is created, the name of the default electronic key and the default remaining time for sharing may be "ekey1" and one hour but are not limited thereto.

Furthermore, if intending to cancel the access privilege of the electronic key, the first user may select or switch to change the privilege-sharing function 164 from an enabled state to a disabled state, such that the second user no longer has the access privilege of the electronic key. In other words, even if the second user receives the electronic key, the electronic key is invalid for operation.

Besides, if intending to further share the access privilege of the electronic key with other persons, in view of analogy, description regarding that the first user can select the key-sharing function 163 on the first user interface 16 as shown in FIG. 4C again to increase a user other than the second user for sharing the access privilege of the electronic key is not elaborated here.

Figure 4D:
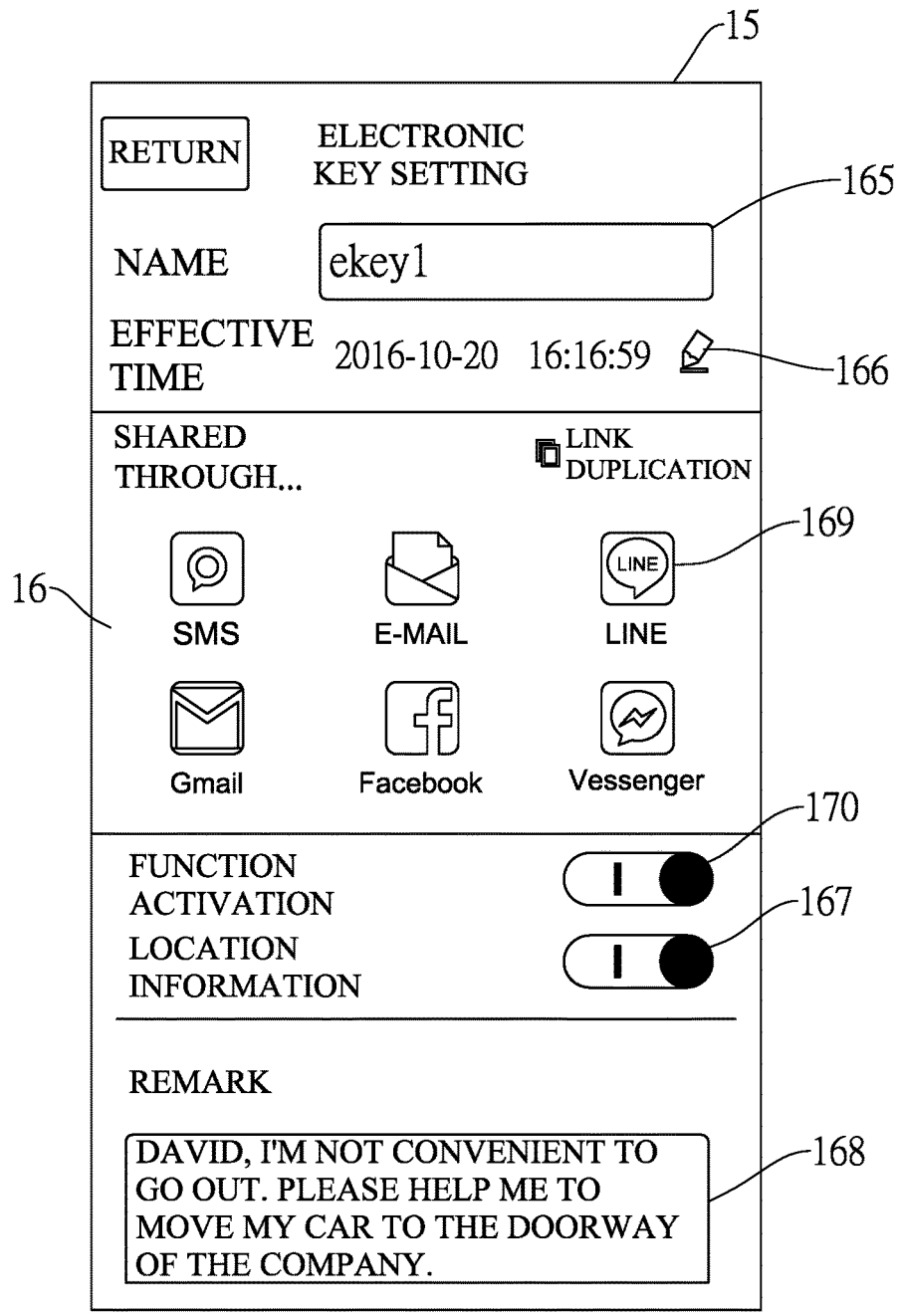
FIG. 4D is a schematic view of the first user interface in FIG. 4A showing a fourth owner operation.

When the name of the electronic key shown on FIG. 4C is selected, the selected electronic key is configured and the access privilege thereof is transmitted. Upon selection of the electronic key, the first user interface 16 displays a corresponding picture on FIG. 4D. As shown in FIG. 4D, the electronic key application further includes a name setting function 165, an effective time setting function 166, a location sharing function 167, a remark function 168, a transmission function 169 and an activation function 170.

When the first user selects the name setting function 165, the default name of the electronic key may be changed to other new name that is more recognizable, especially when the access privilege of the electronic key is shared by multiple persons at the same time. Moreover, when the first user transmits the privilege sharing information to the second user, the name of the electronic key is transmitted to and shown on the second user device 12. When the first user selects the effective time setting function 166, the time for sharing the access privilege may be changed. The effective time setting function 166 may be available to the setting of remaining time for sharing or that of designated expiration time to facilitate the awareness of manipulation of the operation condition for sharing the access privilege of the electronic key.

When the first user selects the location sharing function 167, the coordinate information and location information of the parking location of the vehicle 20 may be transmitted in parallel to transmission of the shared access privilege information to the second user. When selecting the remark function 168, the first user may input texts about how to use the electronic key within the first user interface 16, which are transmitted to the second user device 12 for the second user to be reminded by the first user and to be aware of the texts commented by the first user for knowing how to use the electronic key, and are also shown on FIG. 5B.

When selecting the transmission function 169, the first user can select any one from communication means including but not limited to multimedia messaging service (MMS), short message service (SMS), e-mail, communication software (e.g. LINE, WhatsApp, WeChat, Snapchat, Facebook, Messenger, Vessenger, Twitter message, and the like), and the like to transmit the shared access privilege of the electronic key to the second user device 12 for the second user to use the electronic key.

When selecting the activation function 170, the first user further shares access privilege of advanced functions with the second user. For example, when the first user selects the activation function 170, the second user is allowed to activate the engine of the vehicle 20 through the second user device 12. In contrast, if the activation function 170 is not selected by the first user, the second user can only open or lock the door of the vehicle through the second user device 12 and is not able to further activate the engine of the vehicle 20. The access privilege of the advanced functions may be exemplified by the foregoing description but are not limited thereto.

Figure 2A:
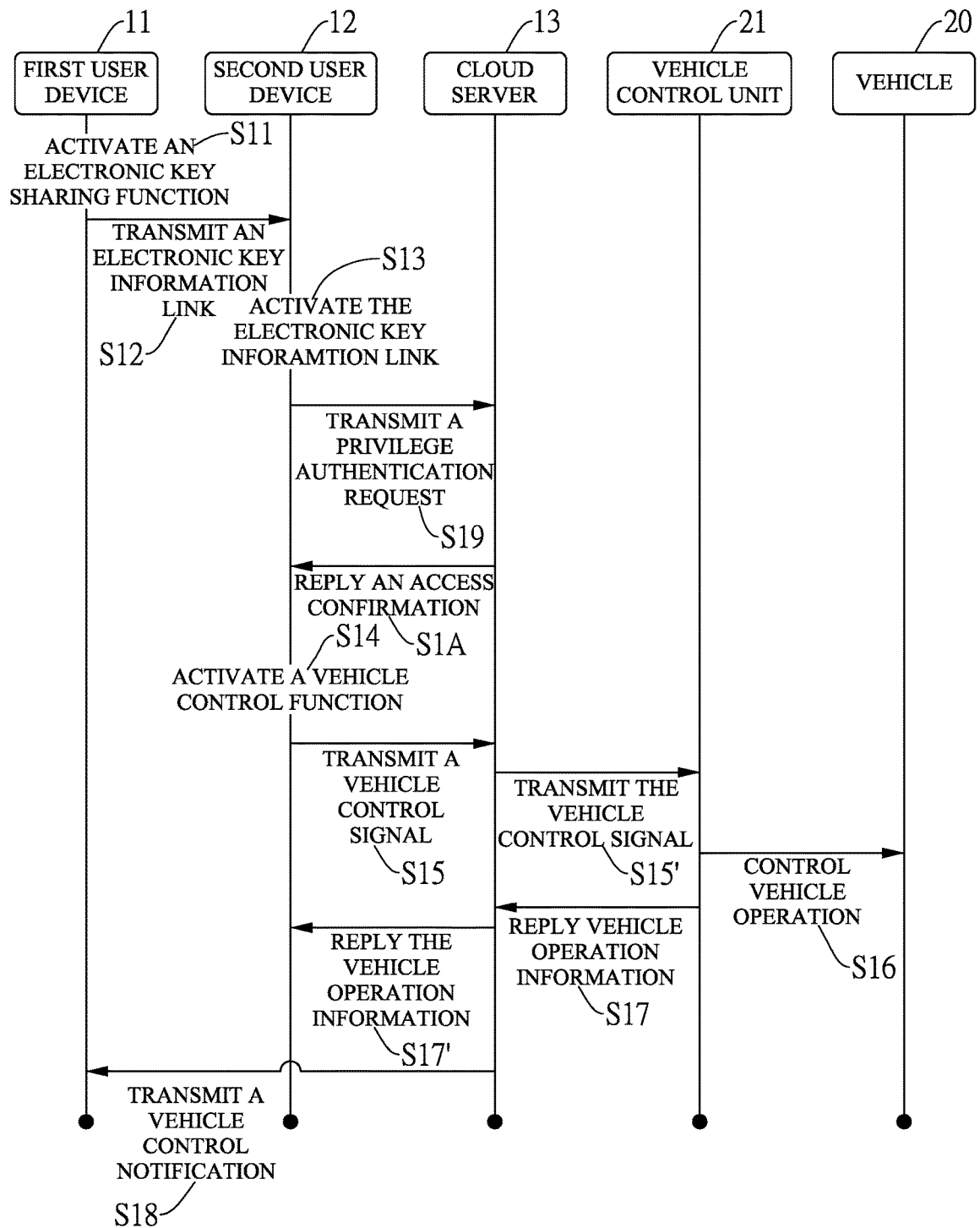
FIG. 2A is a sequence diagram showing a first type of operation for sharing access privilege to a vehicular electronic key in accordance with the present invention.
Figure 2B:
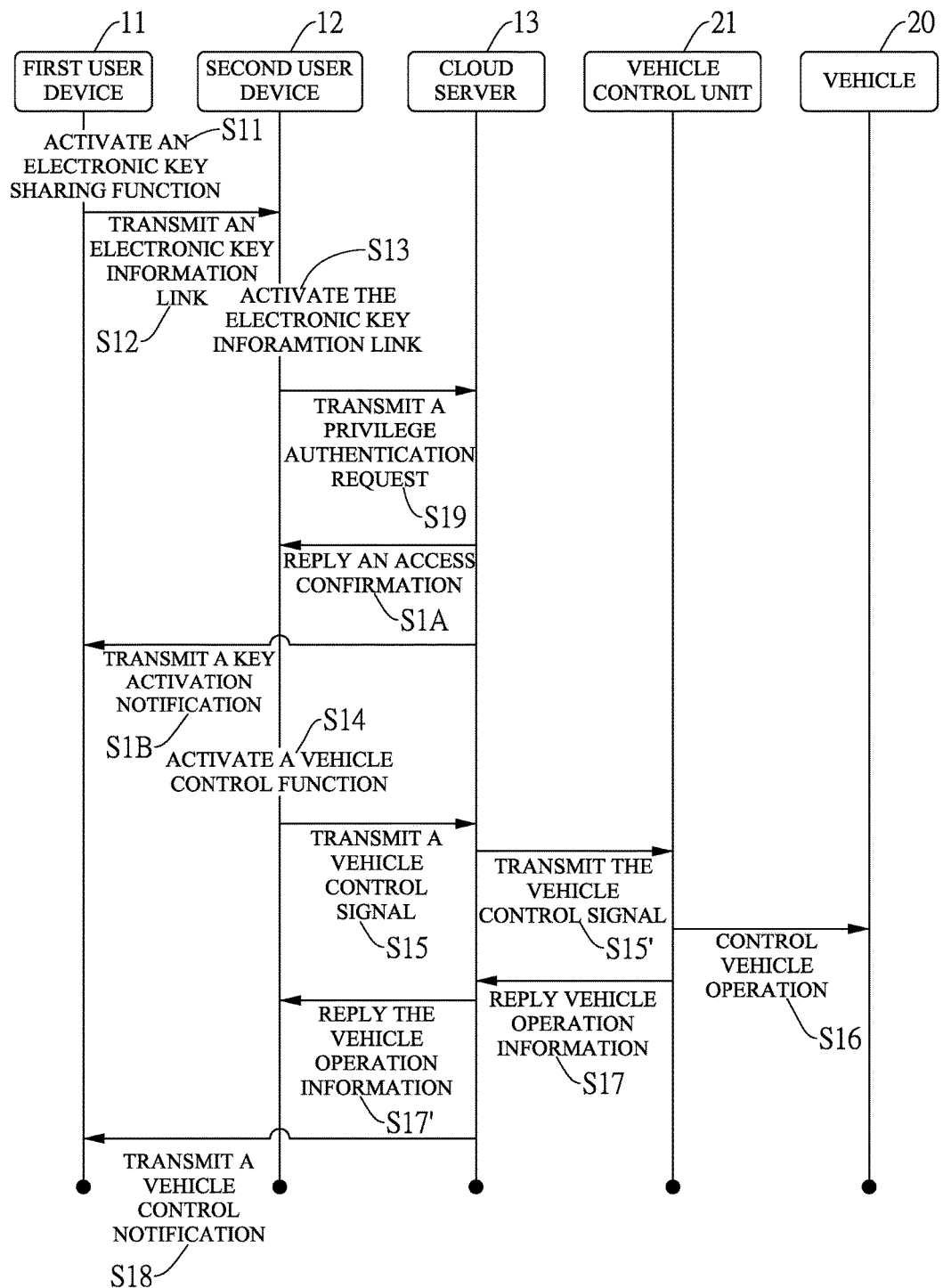
FIG. 2B is a sequence diagram showing a second type of operation for sharing access privilege to a vehicular electronic key in accordance with the present invention.

With further reference to FIGS. 2A and 2B, when selecting the electronic key sharing function (S11), the first user can further perform the electronic key sharing function 160 as shown in FIG. 4A to selectively execute the electronic key function 161, the instant location function 162, the key-sharing function 163, the privilege sharing function 164, the name setting function 165, the effective time setting function 166, the location sharing function 167 and the remark function 168 as discussed previously. Then, the first user device 11 transmits the electronic key information link to the second user device 12 (S12) by performing the transmission function 169.

For example, when the first user device 11 transmits the electronic key information link through the Internet and the cloud server 13, web address information to be linked corresponding to the electronic key information link may be inputted through the operation interface for operation of used SMS, e-mail or communication software. Hence, when the electronic key information link is transmitted to the second user device 12, the electronic key information link received by the second user device 12 is the web address information to be linked.

During the process of transmitting the electronic key information link from the first user device 11 to the second user device 12, hashing is introduced to preserve information integrity and authenticate identity. For example, original content of the electronic key information link can be processed by a cryptographic hash function, which may be SHA-512 but not limited thereto. A hashed value is obtained after the electronic key information link is processed by the cryptographic hash function and is then transmitted to the second user device 12. After the second user device 12 receives the hashed value and the hashed value is authenticated by the cloud server 13, if the hashed value is correct or is identical to that stored in the cloud server 13, it means that the electronic key information link has not been tampered and also confirms that the second user device 12 is a correct device capable of sharing the access privilege of the electronic key. Accordingly, the effectiveness of preserving the information integrity and authenticating identity can be attained and the security of sharing the access privilege of the electronic key is enhanced.

Figure 5A:
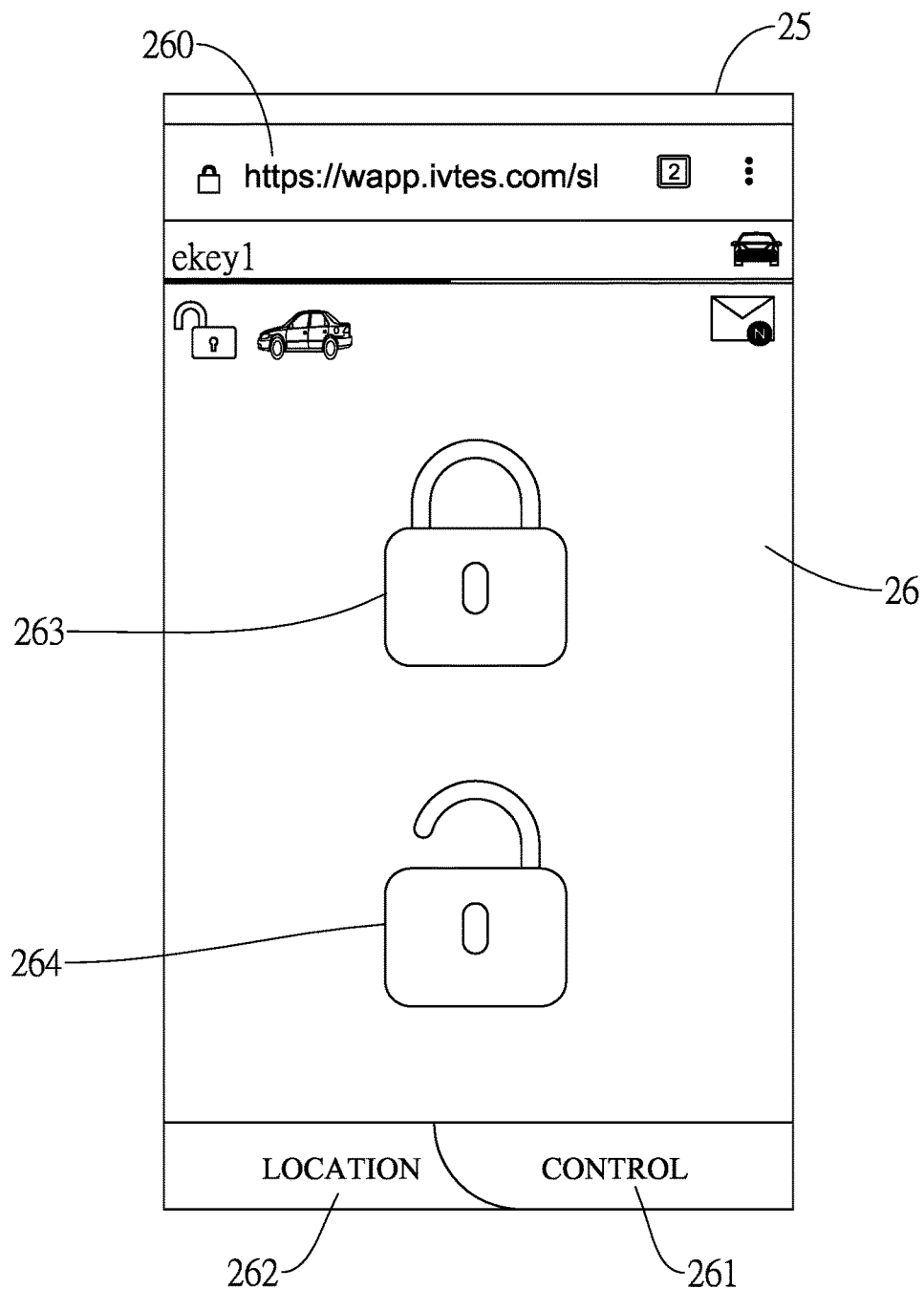
FIG. 5A is a schematic view of a second user interface showing a first authorized operation in accordance with the present invention.
Figure 5B:
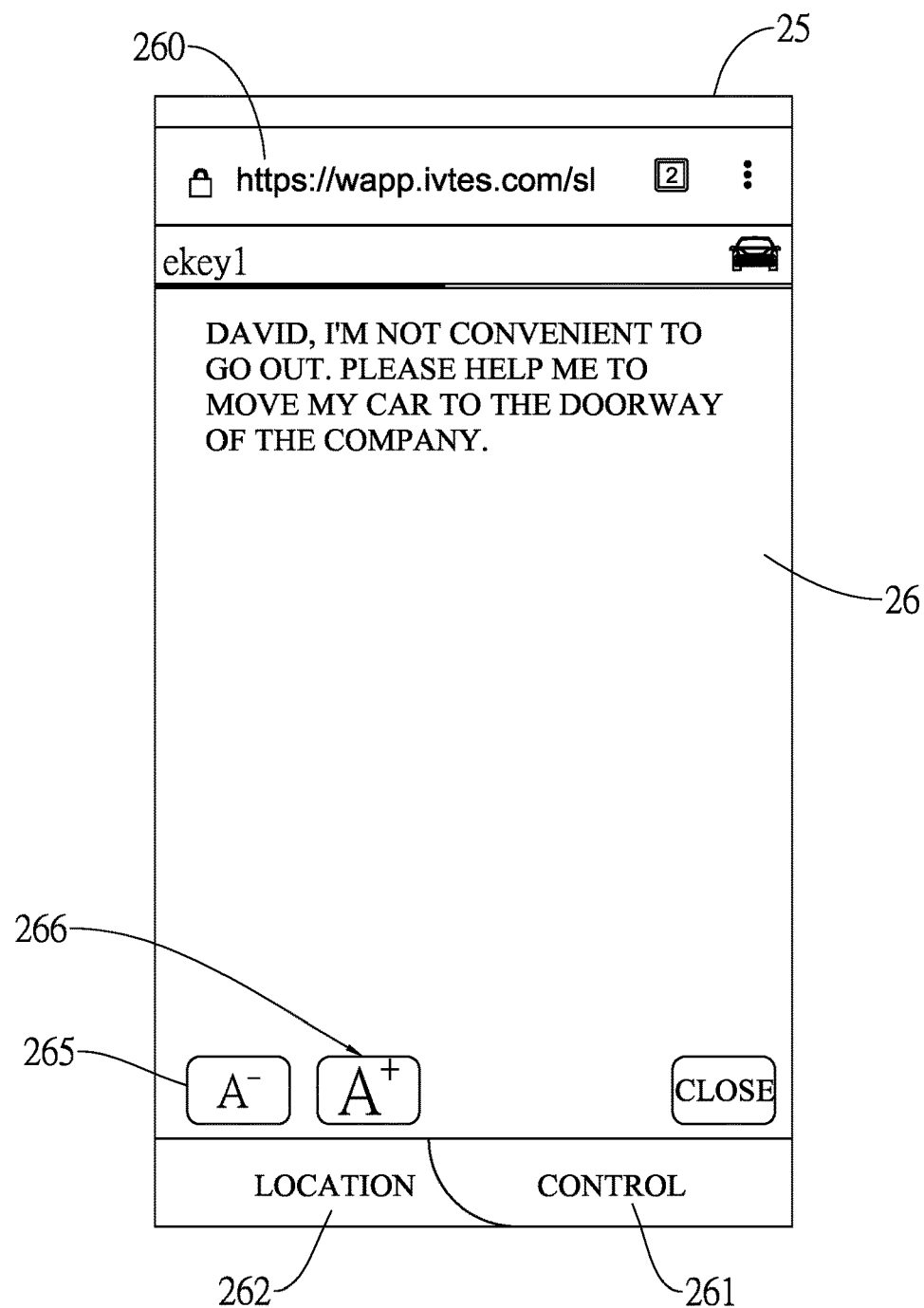
FIG. 5B is a schematic view of the second user interface in FIG. 5A showing a second authorized operation.

With reference to FIG. 5A, the second user device 12 has a second display screen 25. When the second user selects the electronic key information link, i.e. the web address information to be linked from the second user device 12, a second user interface 26 is displayed on the second display screen 25 of the second user device 12. The second user interface 26 is a web-based interface. When the electronic key information link is clicked on the second user interface 26 (S13), the second user interface 26 displays the web address information to be linked 260 on a top portion of the web-based interface.

With reference to FIG. 2A, after the electronic key information link is selected from the second user device 12 (S13), the access privilege of the second user device 12 is further authenticated. Specifically, after step S13, the second user device 12 transmits a privilege authentication request, which may be generated by the hashing for the electronic key, to the cloud server 13 (S19). In the present embodiment, because the privilege authentication request is generated when the first user device 11 activates the electronic key sharing function and transmits an access privilege request to the cloud server 13, the cloud server 13 replies the privilege authentication request to the first user device 11 according to the access privilege request. Then, the first user device 11 transmits the privilege authentication request and the electronic key information link as a whole to the second user device 12. When selecting the electronic key information link, the second user device 12 transmits the privilege authentication request to the cloud server 13 for the cloud server 13 to authenticate the privilege authentication request with information associated with privilege authentication stored therein. If the content of the privilege authentication request is authenticated by the cloud server 13 to be correct, the cloud server 13 replies an access confirmation to the second user device 12 (S1A). Thus, when the second user receives the access confirmation through the second user device 12, the second user is aware that the second user device 12 has the access privilege. Otherwise, if the second user device 12 does not receive the access confirmation or a received message is not a notice for the access confirmation, it means that the second user device 12 is an invalid device accessing the electronic key.

After the second user device 12 is authenticated, the second user activates a vehicle control function (S14) on the second user interface 26 of the second user device 12 for the second user device 12 to transmit a vehicle control signal to the cloud server 13 (S15) through the Internet. When receiving the vehicle control signal, the cloud server 13 further transmits the vehicle control signal to the vehicle control unit 21 (S15').

When receiving the vehicle control signal transmitted from the cloud server 13, the vehicle control unit 21 outputs the vehicle control signal to control vehicular operation (S16). Furthermore, the vehicle control unit 21 replies vehicular operation information to the cloud server 13 (S17). After receiving the vehicular operation information, the cloud server 13 replies the vehicular operation information to the second user device 12 (S17'). The second user who receives the vehicular operation information through the second user device 12 can be aware that the vehicle control unit 21 has performed corresponding control operation to the vehicle 20.

It is optional and unrestricted that when replying the vehicular operation information to the second user device 12, the cloud server 13 may transmit a vehicle control notification to the first user device 11 (S18), such that the first user can be aware what type of control or operation status at which the vehicle 20 is positioned by receiving the vehicle control notification.

With further reference to FIG. 2B, FIG. 2B primarily differs from FIG. 2A in that after the cloud server 13 replies the access confirmation to the second user device 12 (S1A) and before the vehicle control function is activated (S14), the cloud server 13 simultaneously transmits a key activation notification to the first user device 11 (S1B) through the Internet upon replying the access confirmation to the second user device 12. Hence, the first user can be aware that the second user device 12 has completed the privilege authentication and become a valid device to access the electronic key by receiving the key activation notification.

Figure 3:
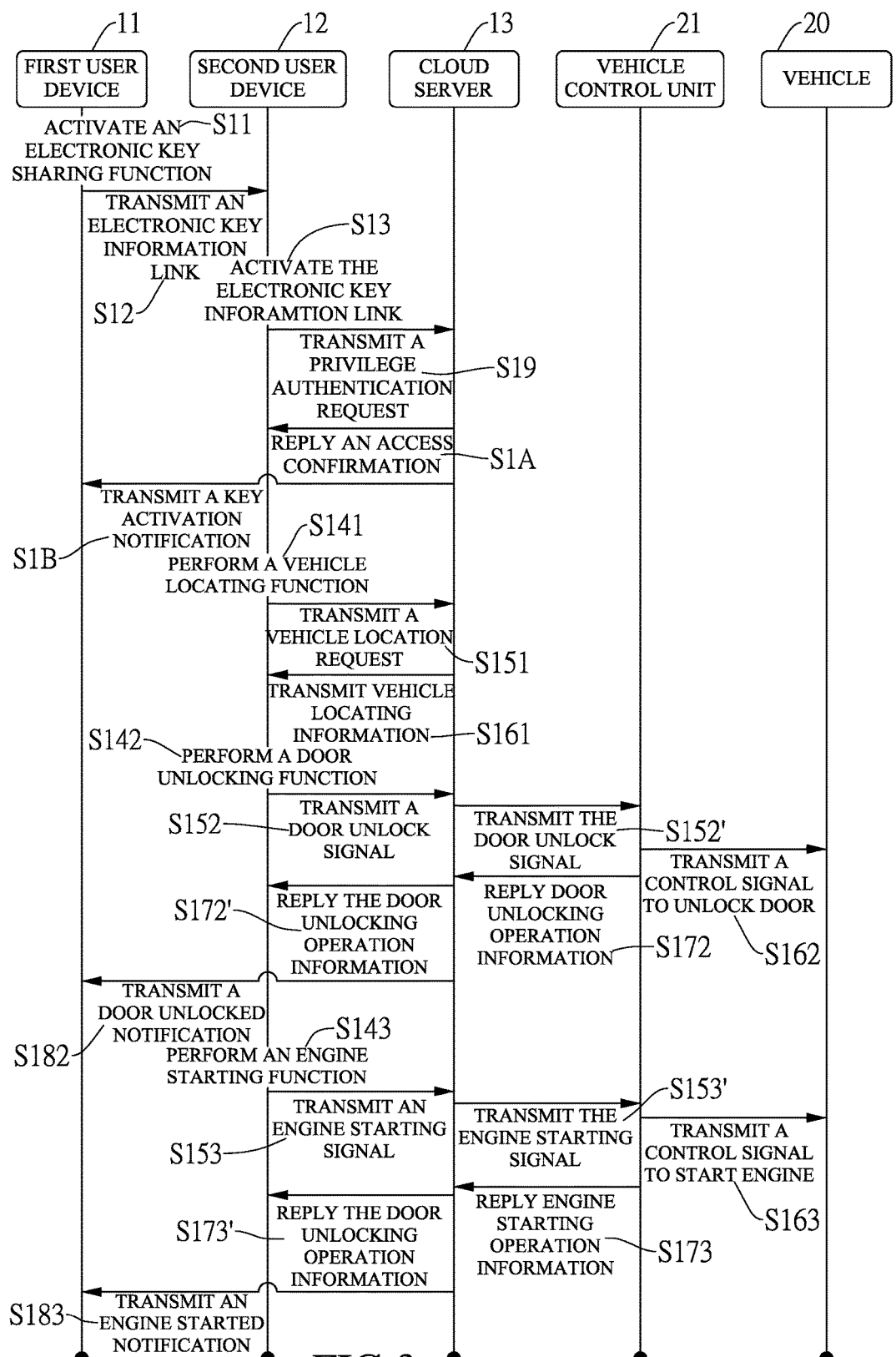
FIG. 3 is a sequence diagram showing detailed operation of the vehicular key in FIG. 2A.

With reference to FIG. 3, the vehicle control function activated in Step S14 includes a vehicle locating function, a door unlocking function and an engine starting function. In other words, when the second user activates the electronic key information link (S13), the second user performs the vehicle locating function (S141), the door unlocking function (S142) or the engine starting function (S143) depending on actual situation.

When the second user forgets where the vehicle 20 is parked, the vehicle locating function (S141) is performed. The second user device 12 transmits a vehicle location request to the cloud server 13 (S151) through the Internet. As the vehicle control unit 21 is constantly connected to the cloud server 13 through the Internet, the vehicle control unit 21 can continuously transmit coordinate information thereof to the cloud server 13. As a result, when receiving the vehicle location request, the cloud server 13 transmits vehicle locating information to the second user device 12 (S161). Thus, the second user can acquire the coordinate information of the parking location of the vehicle 20.

Figure 6:
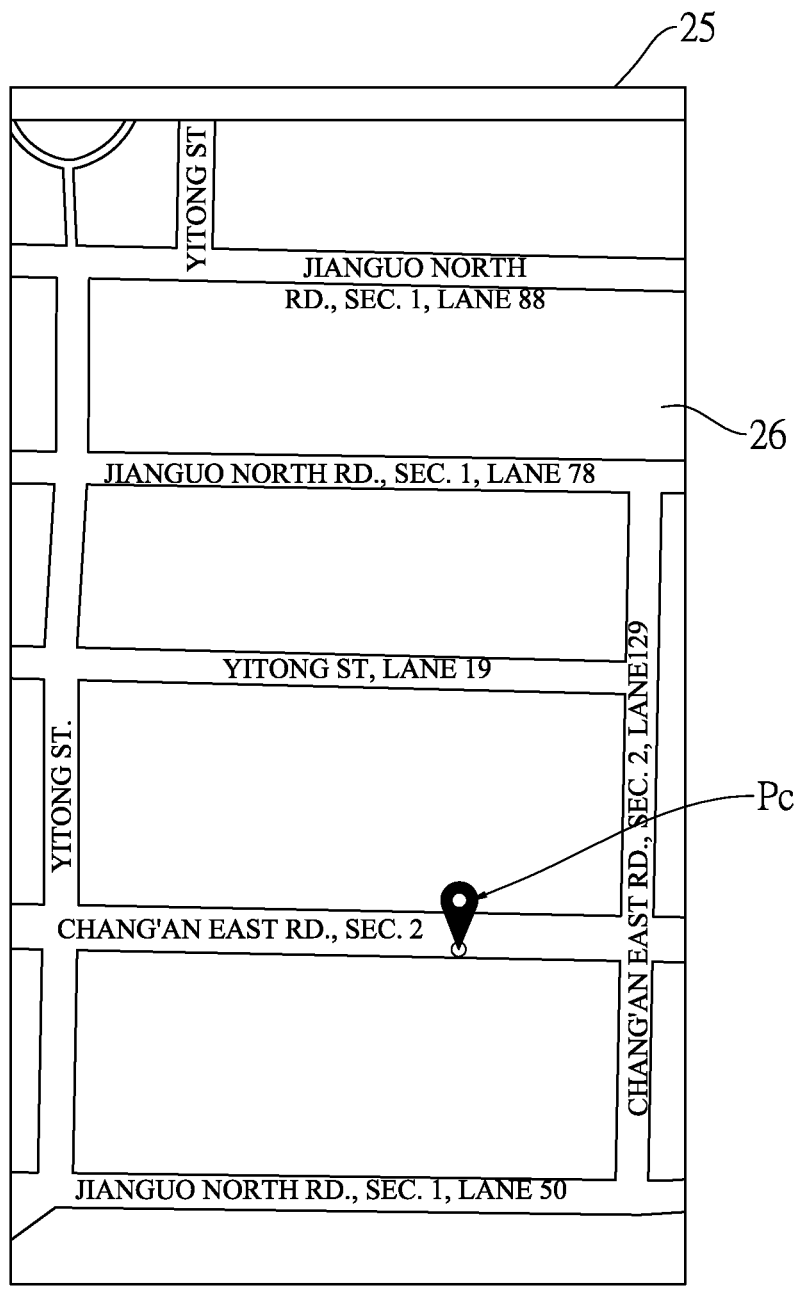
FIG. 6 is a schematic view of the second user interface in FIG. 5A showing a third authorized operation.

With reference to FIG. 6, the second user interface 26 generated by the second display screen 25 of the second user device 12 can display location information Pc. In the present embodiment, the location information of the vehicle 20 may be presented in the form of a digital map but is not limited thereto. For example, street view information, satellite image or texts may be used to show the location information of the parking location of the vehicle 20.

With further reference to FIG. 3, when the second user already knows where the vehicle 20 is parked or locates the vehicle through the vehicle locating information, the door unlocking function (S142) is then performed. The second user device 12 transmits a door unlock signal to the cloud server 13 (S152) through the Internet. When receiving the door unlock signal, the cloud server 13 further transmits the door unlock signal to the vehicle control unit 21 (S152').

When receiving the door unlock signal transmitted from the cloud server 13, the vehicle control unit 21 outputs a control signal to unlock the door of the vehicle 20 (S162). Furthermore, the vehicle control unit replies door unlocking operation information to the cloud server 13 (S172). When receiving the door unlocking operation information, the cloud server 13 further transmits the door unlocking operation information to the second user device 12 (S172'). Thus, the second user can be aware that the vehicle control unit 21 has unlocked the door of the vehicle 20 by receiving the door unlocking operation information through the second user device 12.

It is optional and unrestricted that when replying the door unlocking operation information to the second user device 12, the cloud server 13 may simultaneously transmit a door unlocked notification to the first user device 11 (S182) through the Internet. Thus, the first user can be aware that the door of the vehicle 20 has been controlled by the vehicle control unit 21 to be in an unlocked state.

When the second user further intends to start the engine of the vehicle 20, the engine starting function (S143) is then performed. The second user device 12 transmits an engine starting signal to the cloud server 13 (S153) through the Internet. When receiving the engine starting signal, the cloud server 13 further transmits the engine starting signal to the vehicle control unit 21 (S153').

When receiving the engine starting signal transmitted from the cloud server 13, the vehicle control unit 21 further outputs a control signal to control the vehicle 20 to start the engine (S163). Furthermore, the vehicle control unit replies engine starting operation information to the cloud server 13 (S173). When receiving the engine starting operation information, the cloud server 13 further replies the engine starting operation information to the second user device 12 (S173'). Thus, the second user can be aware that the vehicle control unit 21 has performed control operation to start engine of the vehicle 20 by receiving the engine starting operation information.

It is optional and unrestricted that when replying the engine starting operation information to the second user device 12, the cloud server 13 may simultaneously transmit an engine started notification to the first user device 11 (S183) through the Internet. Thus, the first user can be aware that the engine of the vehicle has been started by the vehicle control unit 21 by receiving the engine started notification.

The foregoing steps associated with notification to the first user device 11, such as Steps S1B, S18, S182 or S183, notify the first user device 11 by way of push message, for example push services provided by the cloud server 13, Google® cloud Messaging (GCM), Apple® Push Notification Service (APNS), Microsoft Push Notification Service (MPNS), or other push servers developed by technical personnel.

Steps performed by the second user can be carried out through functions displayed on FIG. 5A. When the electronic key information link on the second user interface 26 is activated (S13), the vehicle control function shown on FIG. 5A includes a control function 261 and a locating function 262. When the second user selects the locating function 262, the second user device 12 performs the vehicle locating function (S141). Detailed description can be referred to FIGS. 3 and 6 and corresponding description and are not repeated here.

When the second user selects the control function 261, the second user interface 26 further provides a lock/engine start function 263 and an unlock/engine shutdown function 264. When the second user briefly clicks on the lock/engine start function 263, the second user device 12 performs a door locking function. Being basic operation to vehicles, the door locking function is therefore not elaborated here. Moreover, when the second user keeps pressing the lock/engine start function 263 for a while, the second user device 12 then performs the engine starting function S143. Detailed description associated with the engine starting function S143 can be referred to FIG. 3 and corresponding description and is thus not repeated here.

Operation associated with texts inputted in the foregoing remark function 168 is described as follows. After the first user transmits texts inputted in the remark function 168 to the second user device 12, the second user can read corresponding texts on the second user interface 26 of the second user device 12. The second user can further adjust the size of the texts displayed on the second user interface 26 by selecting a font size reduction function 265 or a font size enlargement function 266.

When the vehicle 20 is parked at a premise of an open space, a ground level of a parking tower, or a roadside where the vehicle control unit 21 can be smoothly connected to the Internet to allow that the first user provides the access privilege of the vehicle to the second user, the vehicle control unit 21 can be directly connected to the cloud server 13 through the Internet. The second user can control the vehicle control unit 21 by using the second user device 12 to connect to the cloud server 13 through the Internet.

Under the circumstance that the vehicle 20 is parked at an underground parking lot where the vehicle control unit 21 fails to be directly connected to the cloud server 13, the second user may not be able to use the second user device 12 to control the vehicle control unit 21 through the cloud server 13. To address the issue, by virtue of a near-field connection means, despite the condition that the vehicle control unit 21 fails to be connected to the cloud server 13 through the Internet, the vehicle control unit 21 can still be connected to the second user device 12 and can be controlled by the second user device 12. The near-field connection means is described as follows in conjunction with corresponding drawings.

Figure 7:
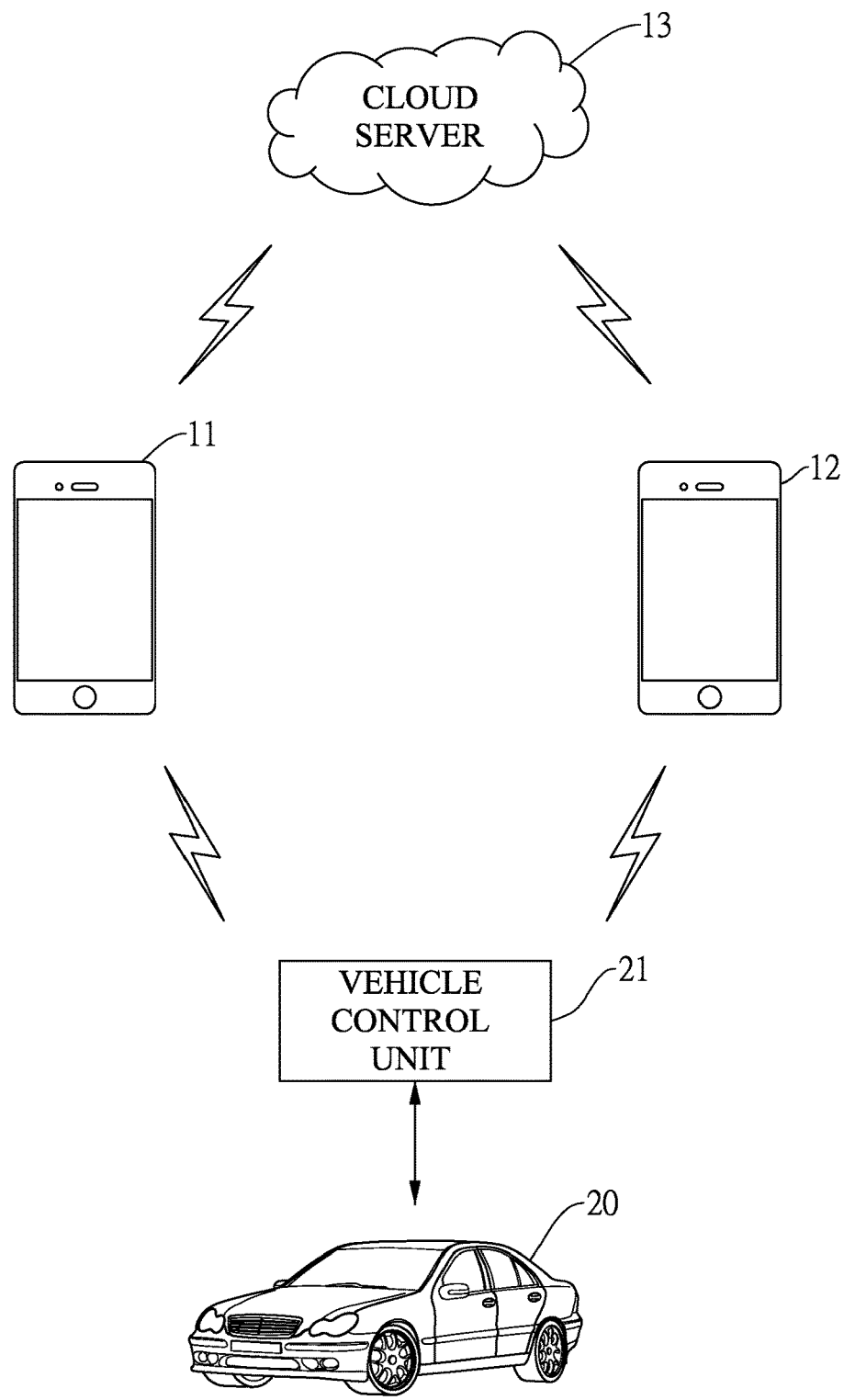
FIG. 7 is a schematic view showing another system architecture of an intelligent vehicular electronic key system in accordance with the present invention.

Each of the first user device 11, the second user device 12 and the vehicle control unit 21 further has a near-field connection function. As shown in FIG. 7, the first user device 11 and the second user device 12 can be connected to the vehicle control unit 21 through the near-field connection function. Moreover, as shown in FIG. 1, the vehicle control unit 21 can be connected to the cloud server 13 in an environment accessible to the Internet. Specifically, such near-field connection function can be implemented by a Bluetooth® module in compliance with Bluetooth® standard. Such near-field connection function is available when the first user device 11 and the second user device 12 are located with a distance therebetween under a limited distance. To ease description of the near-field connection function, the near-field connection can be represented by the Bluetooth® connection but not limited thereto.

Figure 8:
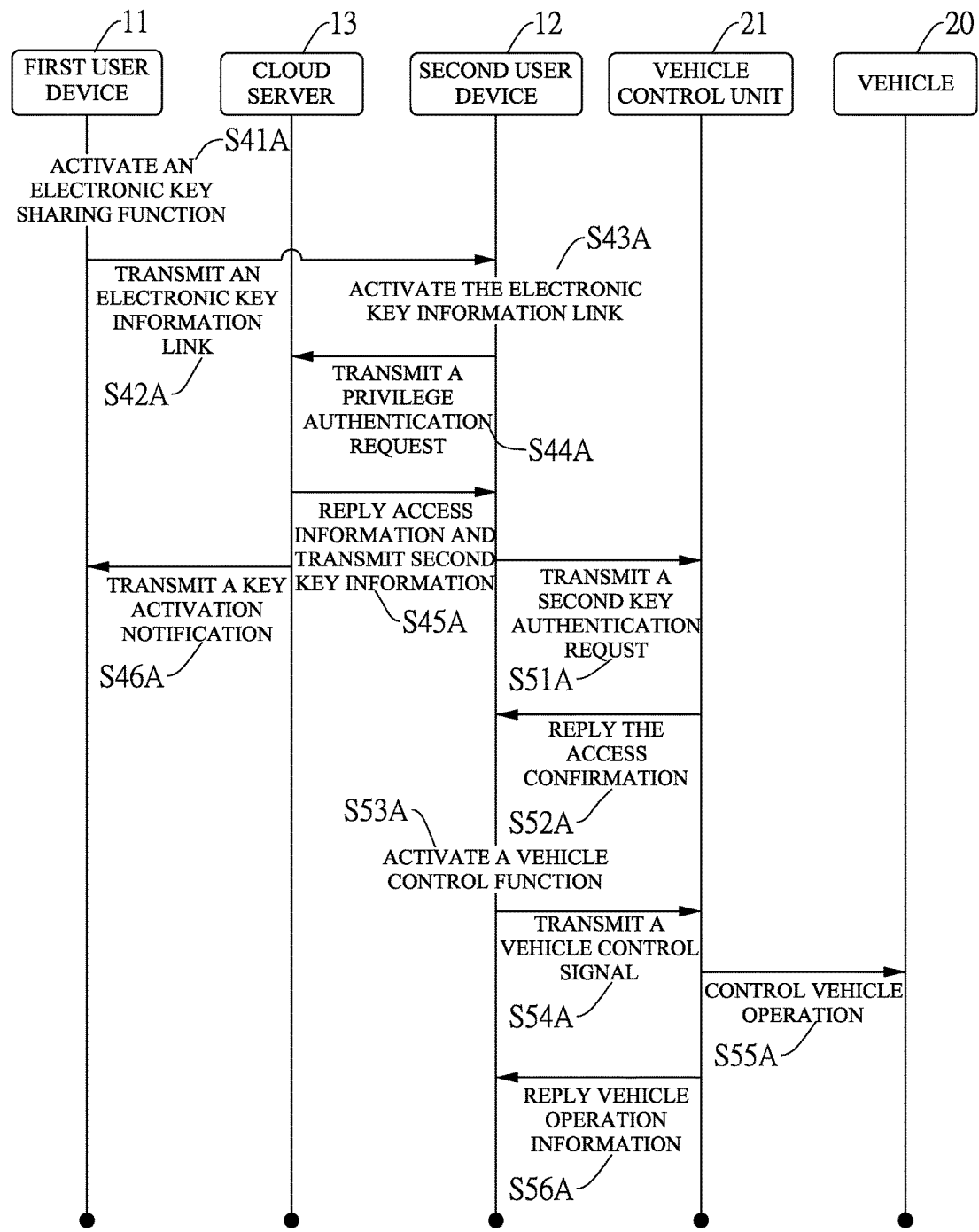
FIG. 8 is a sequence diagram showing a third type of operation for sharing access privilege to a vehicular electronic key in accordance with the present invention.
Figure 10A:
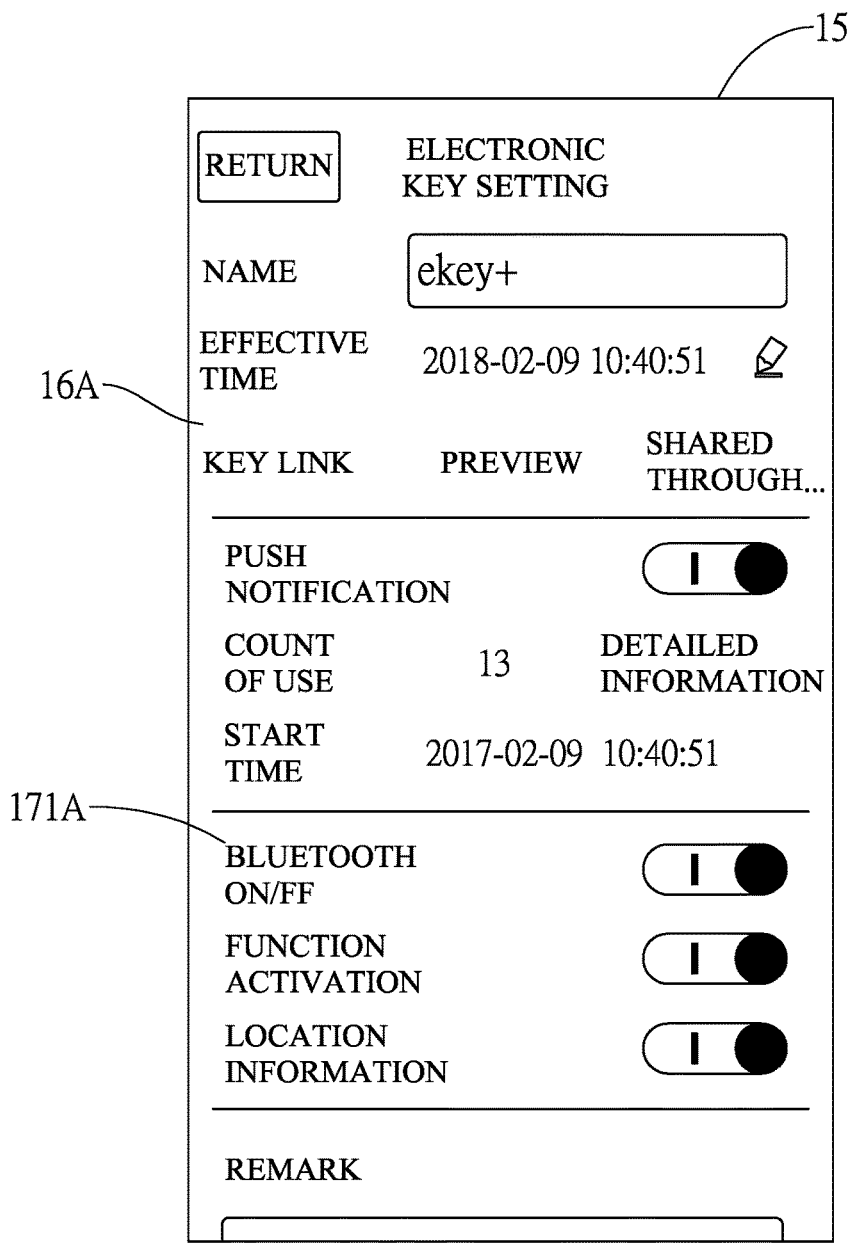
FIG. 10A is a schematic view of the first user interface in FIG. 4A showing a fifth owner operation.

To describe the technical solution for control through the near-field connection, with reference to FIGS. 7 and 8, the vehicle control unit 21 is built in with at least one set of first key information. When the first user device 11 activates the electronic key sharing function (S41A), as shown in FIG. 10A, the first display screen 15 of the first user device 11 displays a first user interface 16A, which provides an electronic key setting function, including setting of name, effective time, link sharing, activation and location information associated with the electronic key, along with a Bluetooth® control function 171A allowing the second user device 12 to connect to the vehicle control unit 21 and control the vehicle 20 through the Bluetooth® connection. After done with the setting of the electronic key information, the first user device 11 transmits the electronic key information link to the second user device 12 (S42A) for the second user device 12 to acquire the access privilege to control the vehicle according to the electronic key information.

After activating the electronic key information link (S43A), the second user device 12 transmits the privilege authentication request to the cloud server 13 (S44A). After confirming that the privilege authentication request is correct, the cloud server 13 replies the access confirmation and transmits second key information to the second user device 12 (S45A). Otherwise, if the second user device 12 fails to receive the access confirmation or receives a message being a notification irrelevant to the access privilege, it means that the second user device 12 is an invalid device to access the electronic key.

Upon replying the access confirmation and transmitting the second key information to the second user device 12, the cloud server 13 transmits the key activation notification to the first user device (S46A) for the first user device to know that the second user has completed the privilege authentication of the electronic key and acquire the access privilege of the electronic key through the first user device 11.

Owing to inaccessibility to the Internet when the vehicle is parked in an underground parking lot, the second user device 12 is connected to the vehicle control unit 21 through the Bluetooth® connection. Specifically, when the first user sets up the electronic key information, the Bluetooth® function is already activated. Hence, when the second user device 12 is connected to the vehicle 20 through the Bluetooth connection, no Bluetooth® pairing is required. For sake of security, after connected to the vehicle control unit 21, the second user device 12 transmits the second key authentication request to the vehicle control unit 21 (S51A), and the vehicle control unit 21 authenticates the second key information with the at least one set of first key information stored in the vehicle control unit 21. When the second key information is authenticated to be identical to any of the at least one set of first key information, the vehicle control unit 21 replies the access confirmation to the second user device 12 (S52A) for the second user device 12 to control the vehicle 20 through the vehicle control unit 21. Otherwise, when the second user device 12 fails to receive the access confirmation or receive a message being a notification irrelevant to the access privilege, it means that the second user device 12 is an invalid device to access the second key information.

Figure 10B:
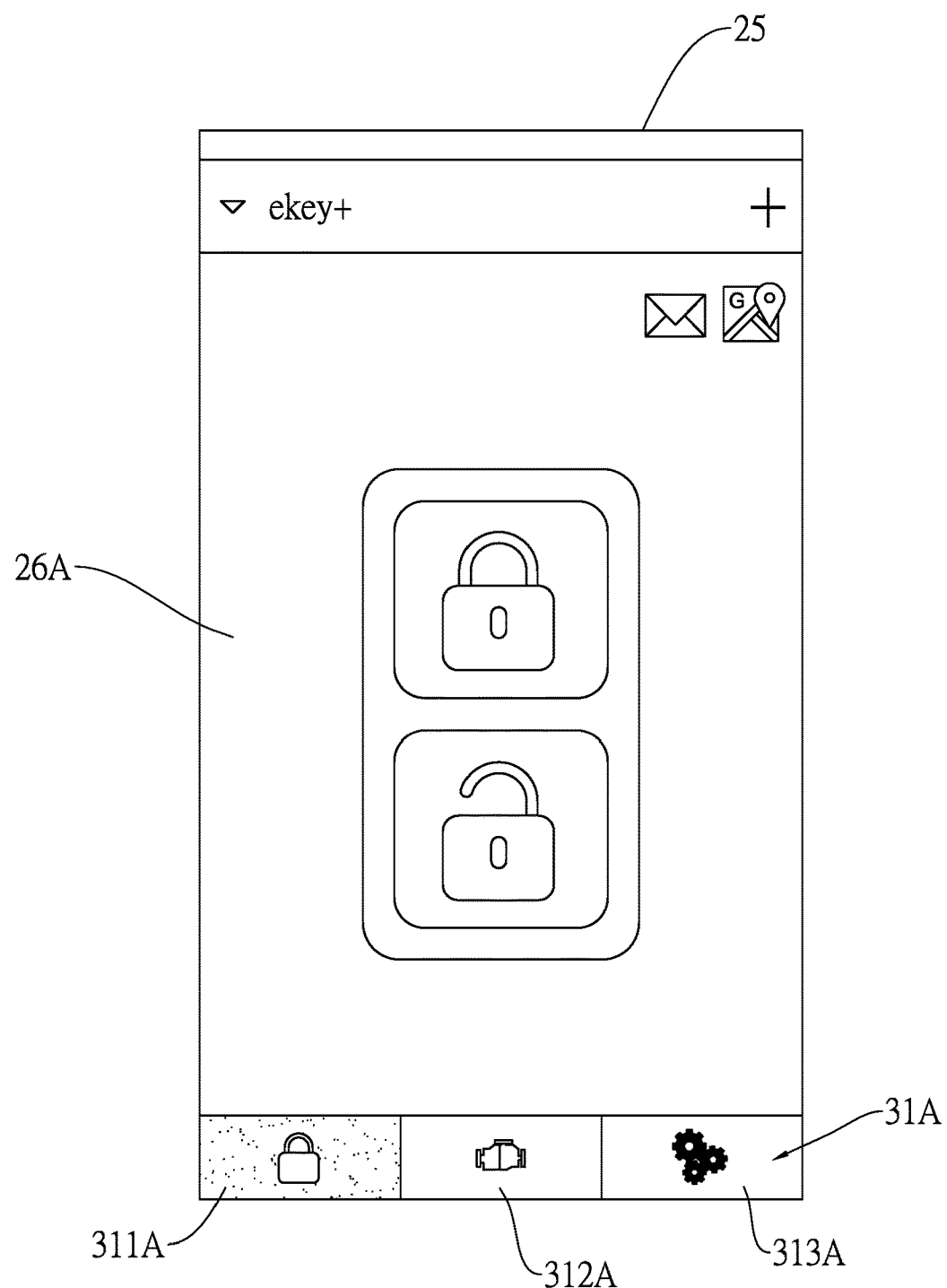
FIG. 10B is a schematic view of the second user interface in FIG. 5A showing a fourth authorized operation.
Figure 10C:
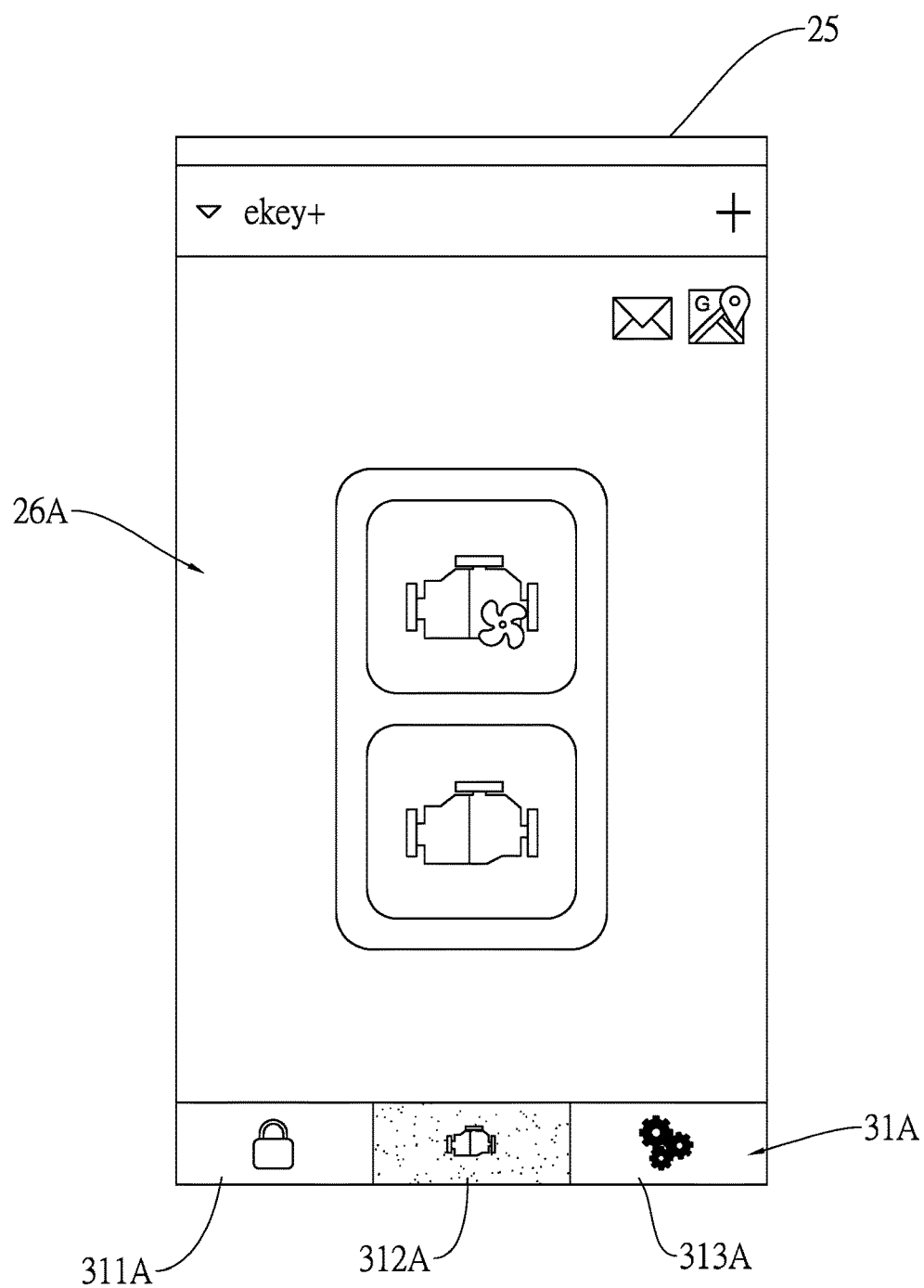
FIG. 10C is a schematic view of the second user interface in FIG. 5A showing a fifth authorized operation.
Figure 10D:
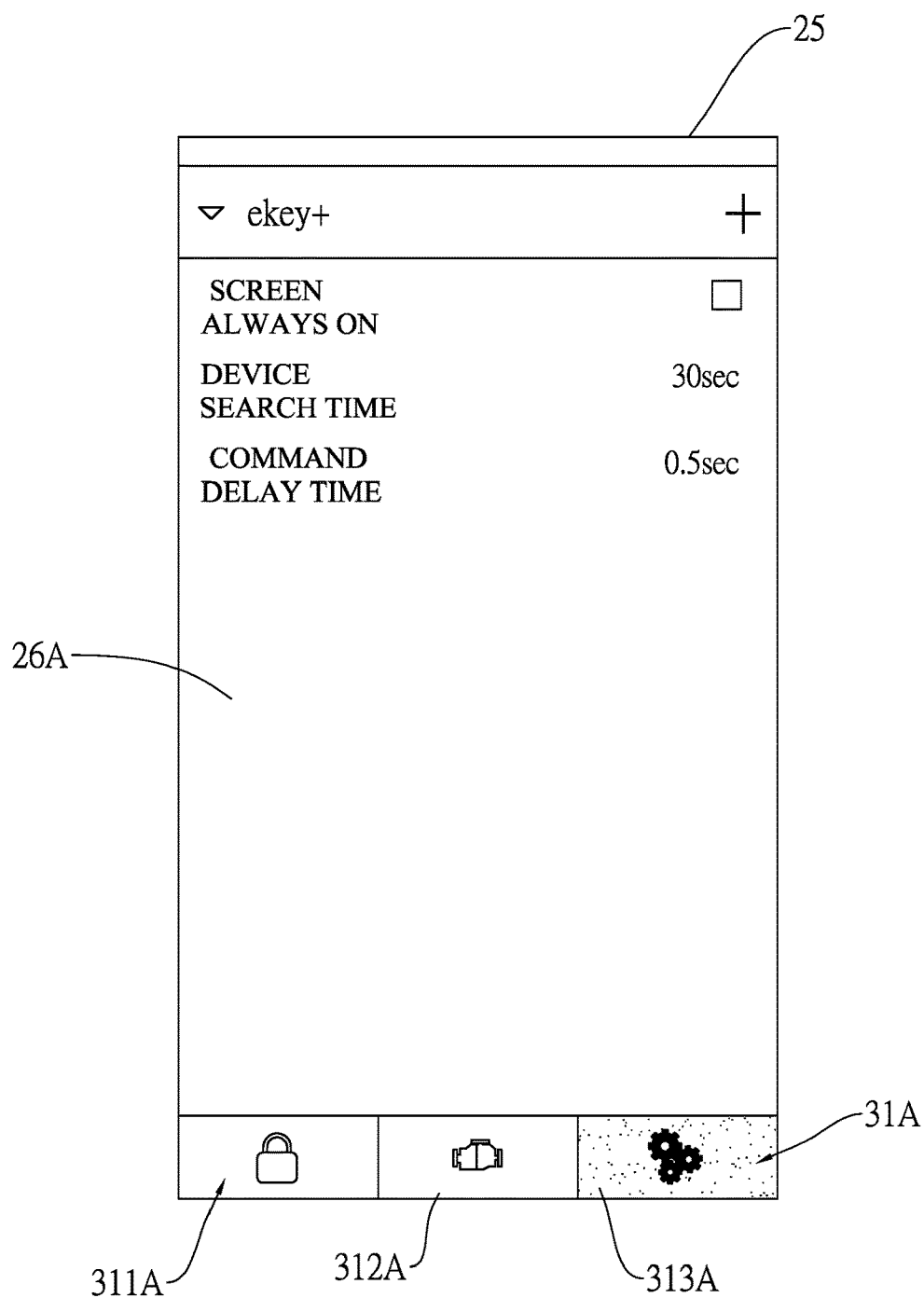
FIG. 10D is a schematic view of the second user interface in FIG. 5A showing a sixth authorized operation.

After acquiring the access privilege for controlling the vehicle 20, the second user device 12 activates a vehicle control function (S53A) as shown in FIGS. 10B to 10D. The second display screen 25 of the second user device 12 provides a second user interface 26A. The second user interface 26A provides a toolbar 31A on a bottom portion of the second user interface 26A. The toolbar 31A includes a lock/unlock tool 311A, an engine control tool 312A and a function setting tool 313A available for the second user to choose.

When the second user selects the lock/unlock tool 311A as shown in FIG. 10B, the second user interface 26A provides a lock function, an unlock function, a timing function and a remark function. When the second user selects the engine control tool 312A as shown in FIG. 10C, the second user interface 26A provides an engine starting function and an engine shutdown function. When the second user selects the function setting tool 313A as shown in FIG. 10D, the second user interface 26A provides a screen always on function, a device search time setting function and a delay time setting for command transmission. The screen always on function serves to keep the second display screen lit constantly. The device search time setting function serves to set up the time required to search Bluetooth® connection for the second user device 12. The delay time setting for command transmission serves to set up a time period between two commands transmitted consecutively for avoidance of collision of commands and retransmission of commands.

With reference to FIG. 8, the second user changes a state of the vehicle 20, such as a door unlocking state, according to a corresponding part to be controlled of the vehicle 20, uses the second user device 12 to encrypt the vehicle control signal, and sends the vehicle control signal to the vehicle control unit 21 through the Bluetooth® connection (S54A). The vehicle control unit 21 outputs a control signal to control operation of the vehicle 20 according to the received vehicle control signal (S55A). After controlling the operation of the vehicle 20, the vehicle control unit 21 replies encrypted vehicle operation information to the second user device 12 (S56A) for the second user to know that the vehicle control unit 21 has controlled operation of the vehicle 20 through the second user device 12.

By using the second user device 12 to acquire the second key information through the cloud server 13 and to connect to the vehicle control unit 21 through the Bluetooth® connection, the second key information can be transmitted to the vehicle control unit 21 for authentication, and after the second key information is authentically successfully, the second user device can acquire the access privilege for controlling the vehicle 20. Thus, under the circumstance that the vehicle control unit 21 fails to connect to the cloud server 13 through the Internet, the second user can still go through the second user device 12 by way of near-field connection to connect to the vehicle control unit 21 so as to control operation of the vehicle 20, thereby allowing the second user device 12 to control the vehicle 20 at the absence of the Internet and further achieving operational convenience.

Figure 9:
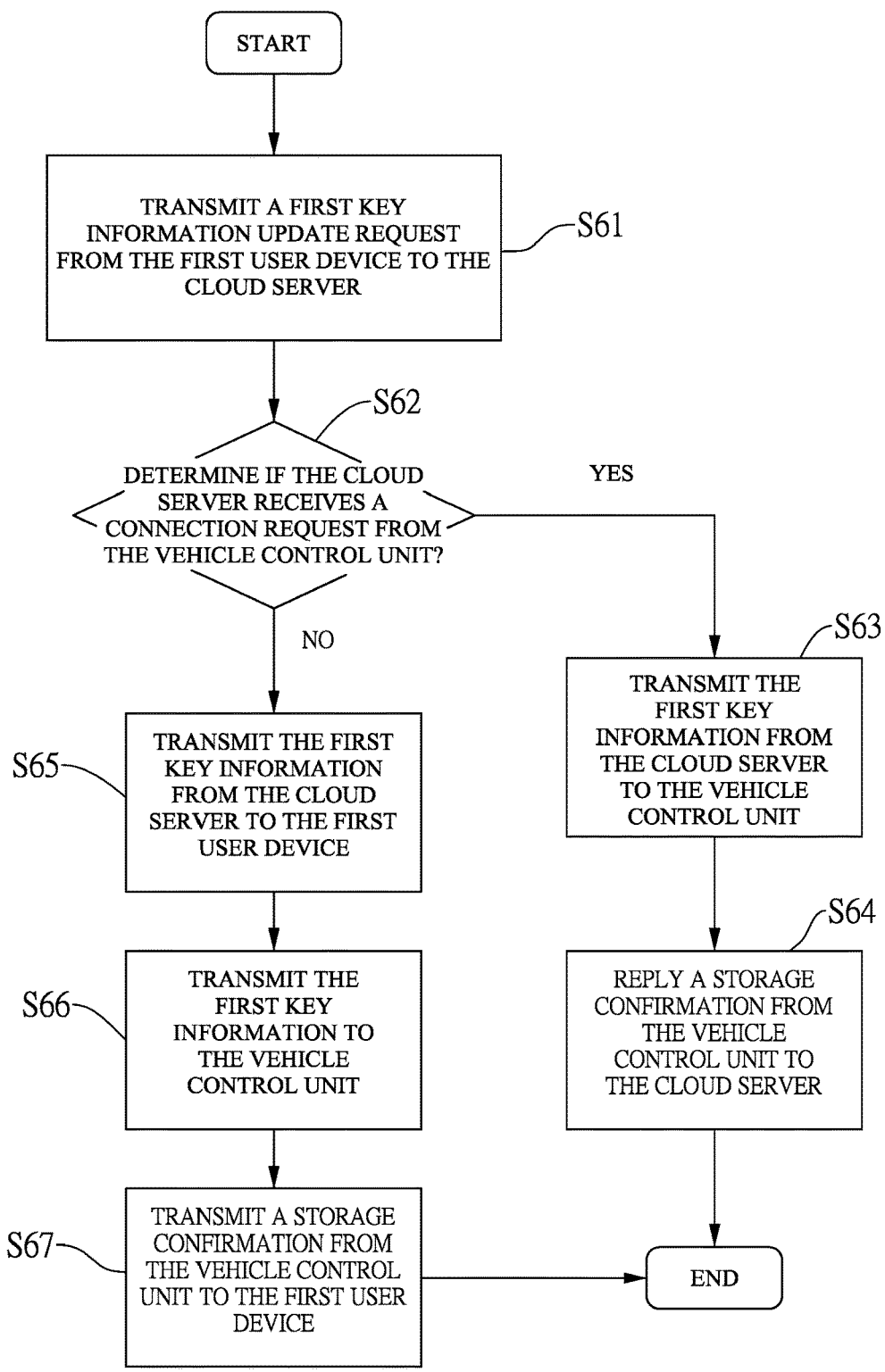
FIG. 9 is a flow diagram of establishing first key information by using a vehicle control unit of the intelligent vehicular electronic key system in FIG. 1.

With reference to FIG. 9, a method for the foregoing intelligent vehicular electronic key system to create the first key information is shown.

Step S61: Connect the first user device 11 to the cloud server 13 through a network to transmit a first key information update request from the first user device 11 to the cloud server 13.

Step S62: Determine if the cloud server 13 receives a connection request from the vehicle control unit 21. If positive, perform step S63. Otherwise, perform step S65. When located in an environment with connectivity to the Internet, the vehicle control unit 21 can connect to the Internet through wireless network connection to transmit the connection request to the cloud server 13. If the located environment has no connectivity to the Internet, the cloud server 13 fails to receive the connection request from the vehicle control unit 21.

Step S63: Directly transmit the first key information from the cloud server 13 to the vehicle control unit 21 through the network and update and store the first key information.

Step S64: After storage of the first key information, reply a storage confirmation from the vehicle control unit 21 to the cloud server 13.

Step S65: Transmit the first key information from the cloud server 13 to the first user device 11.

Step S66: Pair the first user device 11 and the vehicle control unit 21 for connection through near-field connection and transmit the first key information to the vehicle control unit 21.

Step S67: Store the first key information in the vehicle control unit 21 and transmit a storage confirmation from the vehicle control unit 21 to the first user device 11. Specifically, when the first user device 11 receives the first key information, the user device moves toward the floor where the vehicle 20 is parked for the first user device 11 and the vehicle control unit 21 to pair for connection, and the first user device 11 is connected to the vehicle control unit 21 after the connection is paired. Transmit the storage confirmation replied from the vehicle control unit 21 from the first user device 11 to the cloud server 13 for storage in the cloud server 13. After storing the first key information, the vehicle control unit 21 can transmit a storage confirmation to the cloud server 13 when the wireless network can be connected to the Internet.

According to the foregoing method, the first key information can be created inside the vehicle control unit 21, such that when intending to control the vehicle 20, the second user device 12 must send the second key information to the vehicle control unit to correctly authenticate the second key information with the first key information stored in the vehicle control unit 21 and then control the vehicle 20 to attain operational safety.

In sum, the present invention has the following features and advantages.

1. By virtue of the intelligent vehicular electronic key system, the first user device 11, the second user device 12 and the vehicle control unit 21 are mutually connected through the Internet by way of the Internet connection for assurance of sharable access privilege using the electronic key to control and operate and enhance operational security of the electronic key.

2. The first user or the vehicle owner can share and cancel the access privilege of the electronic key and configure the time setting for sharing the access privilege to enhance operational security in using the electronic key.

3. The secure hashing algorithm computes and converts the transmitted electronic key information link to preserve data integrity and achieve identity authentication and to further enhance security in sharing the access privilege of the electronic key.

4. When performing the vehicle control function, the second user device 12 further transmits corresponding operational notification to the first user device 11 for the first user or the vehicle owner to get hold of the state of the vehicle under control.

5. When the vehicle 20 is parked in an underground parking lot, the second user device 12 can connect to the vehicle control unit 21 by way of near-field connection, such that when failing to connect to the cloud server 13 through the Internet, the vehicle control unit 21 can control the vehicle 20 to enhance operational convenience.

6. The second user device 12 is used to acquire the second key information, which is authenticated with the first key information in the vehicle control unit 21, such that the second user device 12 under the condition connected to the vehicle control unit 21 by the near-field connection still needs to be authenticated by key information to maintain operational security.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An intelligent vehicular electronic key system, comprising:
    a cloud server;
    a first user device having a wireless network connection function and connected to the cloud server through an Internet;
    a second user device having a wireless network connection function and connected to the cloud server through the Internet; and
    a vehicle control unit installed inside a vehicle, having a wireless network connection function, and connected to the cloud server through the Internet;
    wherein after activating an electronic key sharing function, the first user device transmits an electronic key information link and a first hash value generated by hashing at the first user device to the second user device, after activating the electronic key information link, the second user device transmits a privilege authentication request, the first hash value, and a second hash value generated by hashing at the second user device to the cloud server, and after the cloud server correctly authenticates the privilege authentication request according to the first hash value and the second hash value and replies an access confirmation to the second user device, the second user device activates a vehicle control function and transmits a vehicle control signal to the vehicle control unit through the cloud server for the vehicle control unit to control operation of the vehicle.

2. The intelligent vehicular electronic key system as claimed in claim 1, wherein the first user device includes an electronic key application, and the first user device performs the electronic key application and generates a first user interface for operation of the electronic key application on a display screen of the first user device, wherein the electronic key application provides the electronic key sharing function for the first user device to transmit the electronic key information link to the second user device through the cloud server.

3. The intelligent vehicular electronic key system as claimed in claim 1, wherein the second user device receives the electronic key information link from the cloud server through the Internet, and after the second user device activates the electronic key information link, the second user device generates a second user interface for displaying the vehicle control function on a display screen of the second user device, wherein the vehicle control function provides the second user device to transmit the vehicle control signal to the vehicle control unit through the cloud server by way of Internet connection.

4. The intelligent vehicular electronic key system as claimed in claim 1, wherein the first user device transmits the electronic key information link to the second user device through the cloud server by way of short message service (SMS), e-mail and communication software.

5. The intelligent vehicular electronic key system as claimed in claim 2, wherein the first user device transmits the electronic key information link to the second user device through the cloud server by way of short message service (SMS), e-mail and communication software.

6. The intelligent vehicular electronic key system as claimed in claim 3, wherein the first user device transmits the electronic key information link to the second user device through the cloud server by way of short message service (SMS), e-mail and communication software.

7. The intelligent vehicular electronic key system as claimed in claim 3, wherein the second user interface is a web-based interface.

8. The intelligent vehicular electronic key system as claimed in claim 1, wherein the vehicle control function includes a vehicle locating function, a door unlocking function and an engine starting function.

9. The intelligent vehicular electronic key system as claimed in claim 8, wherein when the second user device performs the vehicle locating function, the second user device transmits a vehicle location request to the vehicle control unit through the cloud server by way of Internet connection, and the vehicle control unit transmits vehicle locating information to the second user device through the cloud server by way of the Internet connection.

10. The intelligent vehicular electronic key system as claimed in claim 8, wherein when performing the door unlocking function, the second user device transmits a door unlock signal to the vehicle control unit through the cloud server for the vehicle control unit to unlock doors of the vehicle.

11. The intelligent vehicular electronic key system as claimed in claim 8, wherein when performing the engine starting function, the second user device transmits an engine starting signal to the vehicle control unit for the vehicle control unit to start an engine of the vehicle.

12. The intelligent vehicular electronic key system as claimed in claim 9, wherein when the second user device performs the vehicle control function, the vehicle control unit further transmits a notification for corresponding operation to the first user device through the cloud server.

13. The intelligent vehicular electronic key system as claimed in claim 10, wherein when the second user device performs the vehicle control function, the vehicle control unit further transmits a notification for corresponding operation to the first user device through the cloud server.

14. The intelligent vehicular electronic key system as claimed in claim 11, wherein when the second user device performs the vehicle control function, the vehicle control unit further transmits a notification for corresponding operation to the first user device through the cloud server.

15. An intelligent vehicular electronic key system comprising:
- a cloud server;
- a first user device having a wireless network connection function and connected to the cloud server through an Internet;
- a second user device having a wireless network connection function and a near-field connection function and connected to the cloud server through the Internet; and
- a vehicle control unit installed inside a vehicle, having a wireless network connection function and the near-field connection function, connected to the cloud server through the Internet, and built in with at least one set of first key information;

wherein after activating an electronic key sharing function, the first user device transmits an electronic key information link and a first hash value generated by hashing at the first user device to the second user device, after activating the electronic key information link, the second user device transmits a privilege authentication request, the first hash value, and a second hash value generated by hashing at the second user device to the cloud server, after the cloud server correctly authenticates the privilege authentication request according to the first hash value and the second hash value and replies an access confirmation and a second key information to the second user device, the second user device transmits a second key authentication request to the vehicle control unit, the vehicle control unit correctly authenticates the second key information with the at least one set of first key information and then replies the access confirmation to the second user device, and the second user device activates a vehicle control function and directly transmits a vehicle control signal to the vehicle control unit for the vehicle control unit to control operation of the vehicle.

16. The intelligent vehicular electronic key system as claimed in claim 15, wherein the first user device further includes a near-field connection function and transmits a first key information update request to the cloud server, the cloud server determines if a connection request is received from the vehicle control unit through the Internet, when the connection request is received, the cloud server transmits the at least one set of first key information to the vehicle control unit for storage, and when the connection request is not received, the cloud server transmits the at least one set of first key information to the first user device for storage, and after the pairing with the vehicle control unit for connection through the near-field connection function, the first user device transmits the at least one set of first key information to the vehicle control unit for storage so as to create the at least one set of first key information inside the vehicle control unit.

17. The intelligent vehicular electronic key system as claimed in claim 16, wherein after storing the at least one set of first key information, the vehicle control unit replies a storage confirmation to the first user device.

18. The intelligent vehicular electronic key system as claimed in claim 16, wherein after storing the at least one set of first key information, the vehicle control unit replies a storage confirmation to the cloud server.

* * * * *